United States Patent
Li et al.

(10) Patent No.: US 12,231,621 B2
(45) Date of Patent: Feb. 18, 2025

(54) SUBBLOCK MERGE MODE FOR INTRA BLOCK COPY

(71) Applicant: Tencent America LLC, Palo Alto, CA (US)

(72) Inventors: Guichun Li, San Jose, CA (US); Xiang Li, Saratoga, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 126 days.

(21) Appl. No.: 17/978,847

(22) Filed: Nov. 1, 2022

(65) Prior Publication Data

US 2023/0336712 A1    Oct. 19, 2023

Related U.S. Application Data

(60) Provisional application No. 63/331,942, filed on Apr. 18, 2022.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/70* (2014.11)

(58) Field of Classification Search
CPC ........................... H04N 19/105; H04N 19/159
See application file for complete search history.

(56) References Cited

U.S. PATENT DOCUMENTS 11,381,832 B2 *  7/2022  Li ................. H04N 19/105
11,546,605 B2 *  1/2023  Lee .............. H04N 19/52
(Continued)

OTHER PUBLICATIONS

Muhammed Coban, et al., Algorithm description of Enhanced Compression Model 4 (ECM 4), Joint Video Experts Team (JVET) of ITU-T SG 16 WP 3 and ISO/IEC JTC 1/SC 29, 23rd Meeting, by teleconference, Jul. 7-16, 2021, Document: JVET-Y2025-v2, pp. 1-32.
(Continued)

*Primary Examiner* — Irfan Habib
(74) *Attorney, Agent, or Firm* — ArentFox Schiff LLP

(57) ABSTRACT

Processing circuitry decodes, from a bitstream carrying a video including a current picture, a signal indicative of a subblock based intra block copy (IBC) merge mode for predicting a current block in the current picture. The processing circuitry determines a predictor offset (also referred to as offset BV) associated with the current block. The predictor offset indicates a predictor block in the current picture corresponding to the current block, the predictor block includes a plurality of predictor subblocks respectively corresponding to a plurality of subblocks in the current block. The processing circuitry determines a first block vector of a first subblock according to a first predictor block vector associated with a first predictor subblock. The processing circuitry reconstructs the first subblock in the current block according to the first block vector that points to a reference block for the first subblock in the current picture.

19 Claims, 31 Drawing Sheets

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2021/0006787 A1* | 1/2021 | Zhang | .................. | H04N 19/176 |
| 2021/0006790 A1* | 1/2021 | Zhang | .................. | H04N 19/139 |
| 2021/0021811 A1* | 1/2021 | Xu | ....................... | H04N 19/167 |
| 2021/0076029 A1* | 3/2021 | Han | ....................... | H04N 19/107 |
| 2021/0092379 A1* | 3/2021 | Zhang | .................. | H04N 19/105 |
| 2021/0092436 A1* | 3/2021 | Zhang | .................. | H04N 19/105 |
| 2021/0127129 A1* | 4/2021 | Zhang | ..................... | H04N 19/96 |
| 2021/0152846 A1* | 5/2021 | Zhang | .................. | H04N 19/543 |
| 2021/0160532 A1* | 5/2021 | Zhang | .................. | H04N 19/105 |
| 2021/0195234 A1* | 6/2021 | Zhang | .................... | H04N 19/70 |
| 2021/0211647 A1* | 7/2021 | Liu | ....................... | H04N 19/137 |
| 2021/0235073 A1* | 7/2021 | Liu | ....................... | H04N 19/105 |
| 2021/0281875 A1* | 9/2021 | Liu | ......................... | H04N 19/52 |
| 2021/0281877 A1* | 9/2021 | Liu | ....................... | H04N 19/159 |
| 2021/0321092 A1* | 10/2021 | Zhang | .................. | H04N 19/517 |
| 2022/0094927 A1* | 3/2022 | Zhang | .................. | H04N 19/157 |
| 2023/0232012 A1* | 7/2023 | Lai | ....................... | H04N 19/176 |
| | | | | 375/240.02 |
| 2023/0336712 A1* | 10/2023 | Li | ......................... | H04N 19/70 |
| 2024/0031595 A1* | 1/2024 | Li | ....................... | H04N 19/172 |

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-664.

\* cited by examiner

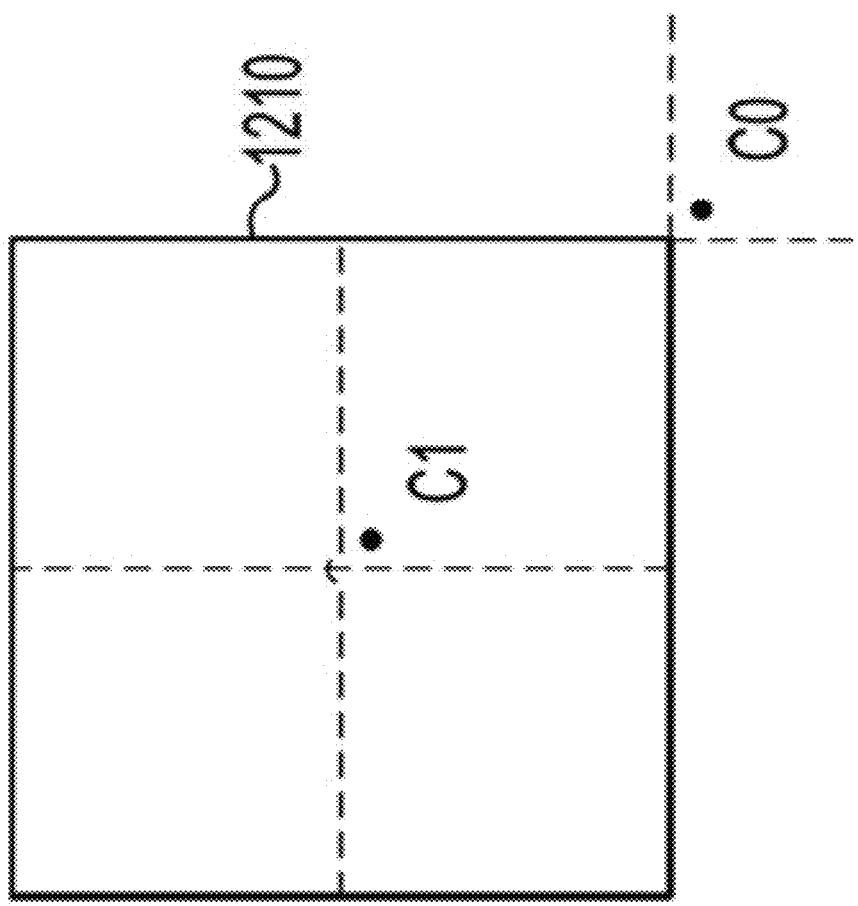

| amvr_flag | amvr_precision_idx | AmvrShift | | |
|---|---|---|---|---|
| | | inter_affine_flag[ x0 ][ y0 ] == 1 | CuPredMode[ chType ][ x0 ][ y0 ] == MODE_IBC | inter_affine_flag[ x0 ][ y0 ] == 0 && CuPredMode[ chType ][ x0 ][ y0 ] != MODE_IBC |
| 0 | - | 2 (1/4 luma sample) | - | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | - | - | 6 (4 luma samples) |

*FIG. 21*

If inter_affine_flag[ x0 ][ y0 ] is equal to 0, the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows:

MvdL0[ x0 ][ y0 ][ 0 ] = MvdL0[ x0 ][ y0 ][ 0 ] << AmvrShift
    MvdL0[ x0 ][ y0 ][ 1 ] = MvdL0[ x0 ][ y0 ][ 1 ] << AmvrShift
    MvdL1[ x0 ][ y0 ][ 0 ] = MvdL1[ x0 ][ y0 ][ 0 ] << AmvrShift
    MvdL1[ x0 ][ y0 ][ 1 ] = MvdL1[ x0 ][ y0 ][ 1 ] << AmvrShift Otherwise (inter_affine_flag[ x0 ][ y0 ] is equal to 1), the variables MvdCpL0[ x0 ][ y0 ][ 0 ][ 0 ], MvdCpL0[ x0 ][ y0 ][ 0 ][ 1 ], MvdCpL0[ x0 ][ y0 ][ 1 ][ 0 ], MvdCpL0[ x0 ][ y0 ][ 1 ][ 1 ], MvdCpL0[ x0 ][ y0 ][ 2 ][ 0 ] and MvdCpL0[ x0 ][ y0 ][ 2 ][ 1 ] are modified as follows:

MvdCpL0[ x0 ][ y0 ][ 0 ][ 0 ] = MvdCpL0[ x0 ][ y0 ][ 0 ][ 0 ] << AmvrShift
    MvdCpL1[ x0 ][ y0 ][ 0 ][ 1 ] = MvdCpL1[ x0 ][ y0 ][ 0 ][ 1 ] << AmvrShift
    MvdCpL0[ x0 ][ y0 ][ 1 ][ 0 ] = MvdCpL0[ x0 ][ y0 ][ 1 ][ 0 ] << AmvrShift
    MvdCpL1[ x0 ][ y0 ][ 1 ][ 1 ] = MvdCpL1[ x0 ][ y0 ][ 1 ][ 1 ] << AmvrShift
    MvdCpL0[ x0 ][ y0 ][ 2 ][ 0 ] = MvdCpL0[ x0 ][ y0 ][ 2 ][ 0 ] << AmvrShift
    MvdCpL1[ x0 ][ y0 ][ 2 ][ 1 ] = MvdCpL1[ x0 ][ y0 ][ 2 ][ 1 ] << AmvrShift

SUBBLOCK MERGE MODE FOR INTRA BLOCK COPY

INCORPORATION BY REFERENCE

The present application claims the benefit of priority to U.S. Provisional Application No. 63/331,942, "Subblock merge mode for Intra Block Copy" filed on Apr. 18, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes, from a bitstream carrying a video including a current picture, a signal indicative of a subblock based intra block copy (IBC) merge mode for predicting a current block in the current picture. The processing circuitry determines a predictor offset (also referred to as offset BV) associated with the current block. The predictor offset indicates a predictor block in the current picture corresponding to the current block, the predictor block includes a plurality of predictor subblocks respectively corresponding to a plurality of subblocks in the current block. The processing circuitry determines a first block vector of a first subblock in the plurality of subblocks according to a first predictor block vector associated with a first predictor subblock of the predictor block. The first predictor subblock corresponds to the first subblock according to the predictor offset. The processing circuitry reconstructs the first subblock in the current block according to the first block vector that points to a reference block for the first subblock in the current picture.

In some examples, the processing circuitry determines the predictor offset according to a block vector of a spatial neighbor of the current block. In an example, the spatial neighbor is a fixed spatial neighbor for the current block. In another example, the spatial neighbor is an adjacent neighbor of the current block. In another example, the spatial neighbor is a non adjacent neighbor of the current block.

In an embodiment, the processing circuitry decodes a signal indicative of the spatial neighbor from the bitstream. In another embodiment, the processing circuitry checks spatial neighbors according to a checking order for a first available block vector, and determines the predictor offset according to the first available block vector.

In an example, the processing circuitry uses the first predictor block vector associated with the first predictor subblock as the first block vector of the first subblock. In another example, the processing circuitry uses a sum of the first predictor block vector and the predictor offset as the first block vector of the first subblock.

In some examples, the current picture is formed by minimal blocks. The processing circuitry determines a minimal block in the predictor block, the minimal block having a point corresponding to a center point of the first subblock according to the predictor offset, and determines the first block vector of the first subblock according to a block vector associated with the minimal block.

In some examples, the processing circuitry determines one or more minimal blocks that overlap with the first predictor subblock, and averages one or more block vectors respectively associated with the one or more minimal blocks to calculate the first predictor block vector.

In some examples, the processing circuitry determines one or more minimal blocks that overlap with the first predictor subblock, and determines one or more weights respectively for the one or more minimal blocks according to respective overlapping area of the one or more minimal blocks with the first predictor subblock. The processing circuitry calculats a weighted average of one or more block vectors respectively associated with the one or more minimal blocks according to the one or more weights, and uses the weighted average as the first predictor block vector associated with the first predictor subblock.

In some examples, the processing circuitry determines one or more minimal blocks that overlap with the first predictor subblock, checks the one or more minimal blocks according to a checking order for a first valid block vector and determines the first block vector according to the first valid block vector.

In some examples, the processing circuitry decodes an index for an IBC merge list, the subblock based IBC merge mode being inserted in the IBC merge list at a position corresponding to the index. In an example, the subblock based IBC merge mode is inserted into the IBC merge list at a first candidate position in the IBC merge list. In another example, the subblock based IBC merge mode is inserted into the IBC merge list at a position after all regular IBC merge candidates. In another example, the subblock based IBC merge mode is inserted into the IBC merge list at a position before IBC history based motion vector predictor (HMVP) candidates.

In an example, the processing circuitry updates an IBC history based motion vector predictor (HMVP) list using a block vector of a top left subblock of the current block. In another example, the processing circuitry updates an IBC HMVP list using a block vector of a bottom right subblock of the current block. In another example, the processing circuitry updates an IBC HMVP list using the predictor offset of the current block. In an example, the processing circuitry skips an update of an IBC history based motion vector predictor (HMVP) list in response to the current block being in the subblock based IBC merge mode.

In some examples, the processing circuitry checks whether a potential predictor block pointed by a block vector of a spatial neighbor of the current block is at least partially out of a valid IBC reference region, and determines that the block vector of the spatial neighbor is unavailable for being a candidate for predicting the current block in the subblock based IBC merge mode in response to the potential predictor block being at least partially out of the valid IBC reference region.

In some examples, the processing circuitry checks that the predictor block indicated by the predictor offset is fully in a valid IBC reference region, and determines that the first block vector of the first subblock points to a reference region that is at least partially out of the valid IBC reference region. The processing circuitry updates the first block vector of the first subblock to be the predictor offset in response to the reference region for the first subblock is at least partially out of the valid IBC reference region.

In some examples, the processing circuitry decodes, from the bitstream, a high level syntax that indicates the subblock based IBC merge mode is enabled.

In some examples, the processing circuitry decodes, from the bitstream, a high level syntax that indicates a disable of IBC, and infers that the subblock based IBC merge mode is disabled at a same level as the high level syntax.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 12 shows exemplary candidate positions for a temporal merge candidate of a current coding unit.

FIG. 21 shows a table for shifting bits in some examples.

FIG. 22 shows a portion of a video coding standard in an example.

FIGS. 23A-23D show examples of reference region in intra block copy according to an embodiment of the disclosure.

FIG. 24 shows a diagram of a current block in a subblock based IBC merge mode in an example.

DETAILED DESCRIPTION OF EMBODIMENTS

Figure 1A:
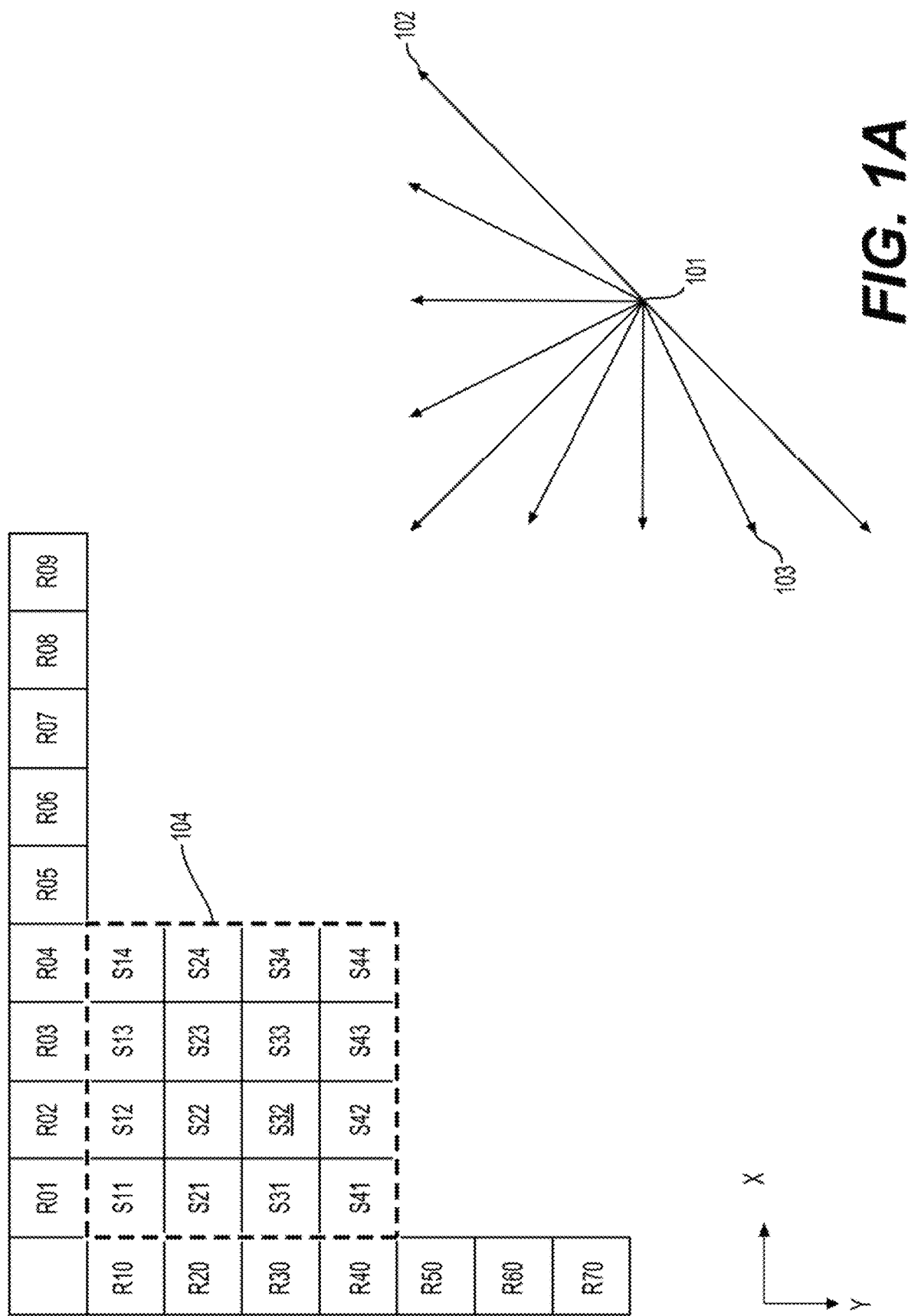
FIG. 1A is a schematic illustration of an exemplary subset of intra prediction modes.
Figure 1B:
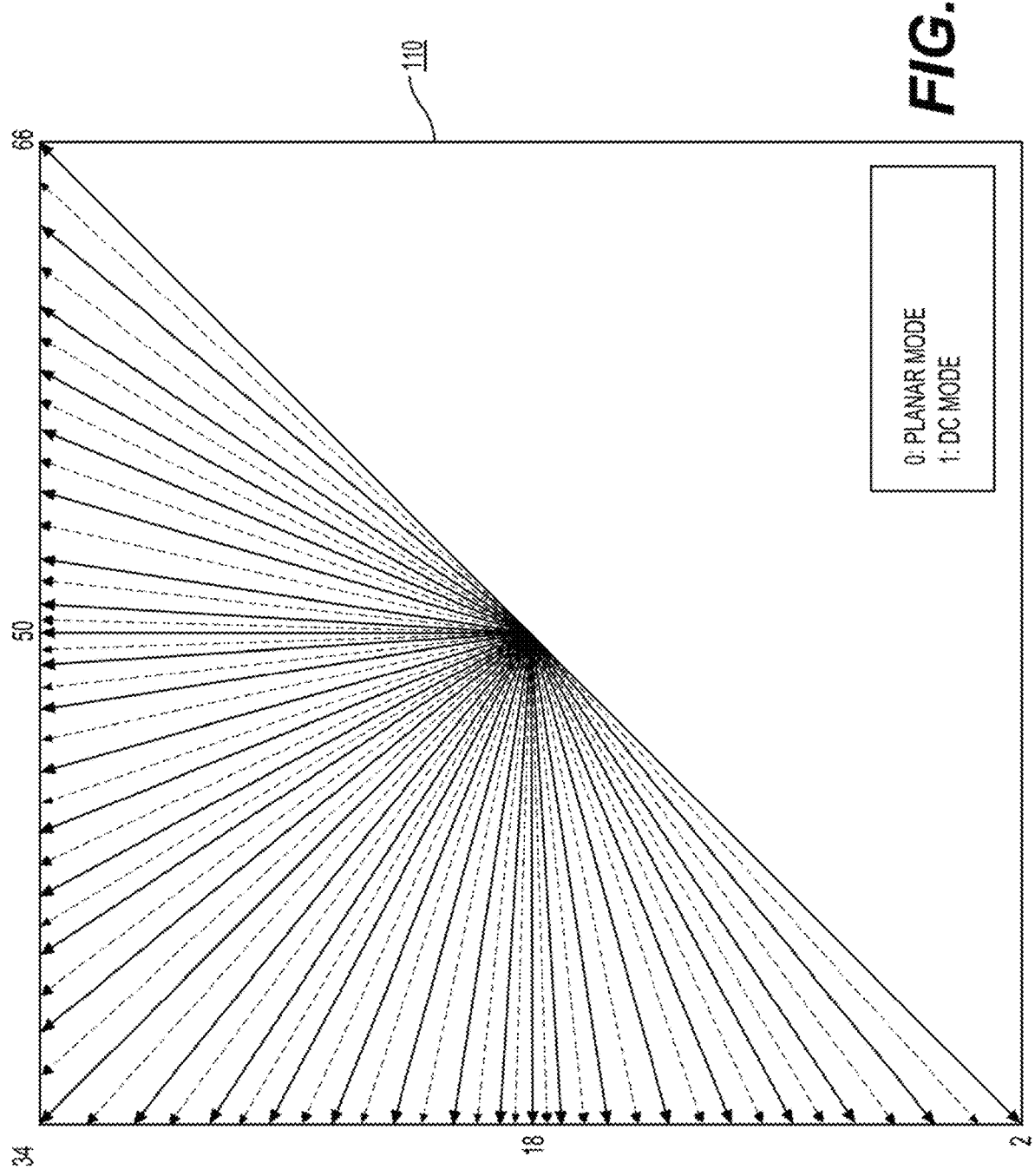
FIG. 1B is an illustration of exemplary intra prediction directions.
Figure 2:
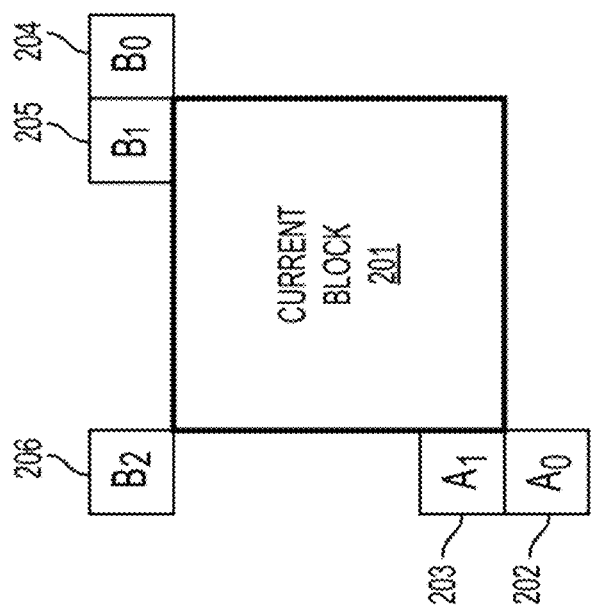
FIG. 2 is a schematic illustration of a current block and its surrounding spatial merge candidates in one example.
Figure 3:
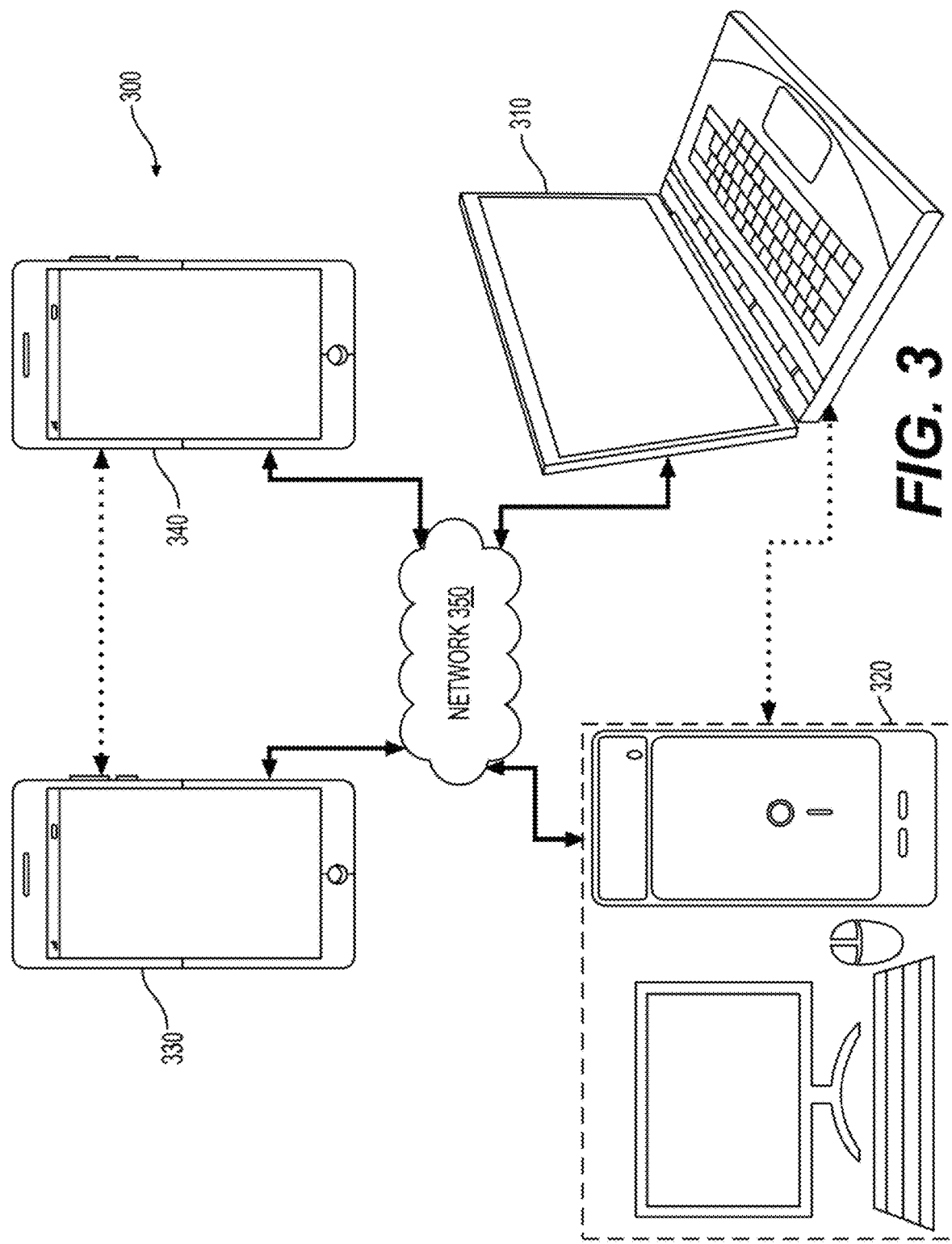
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
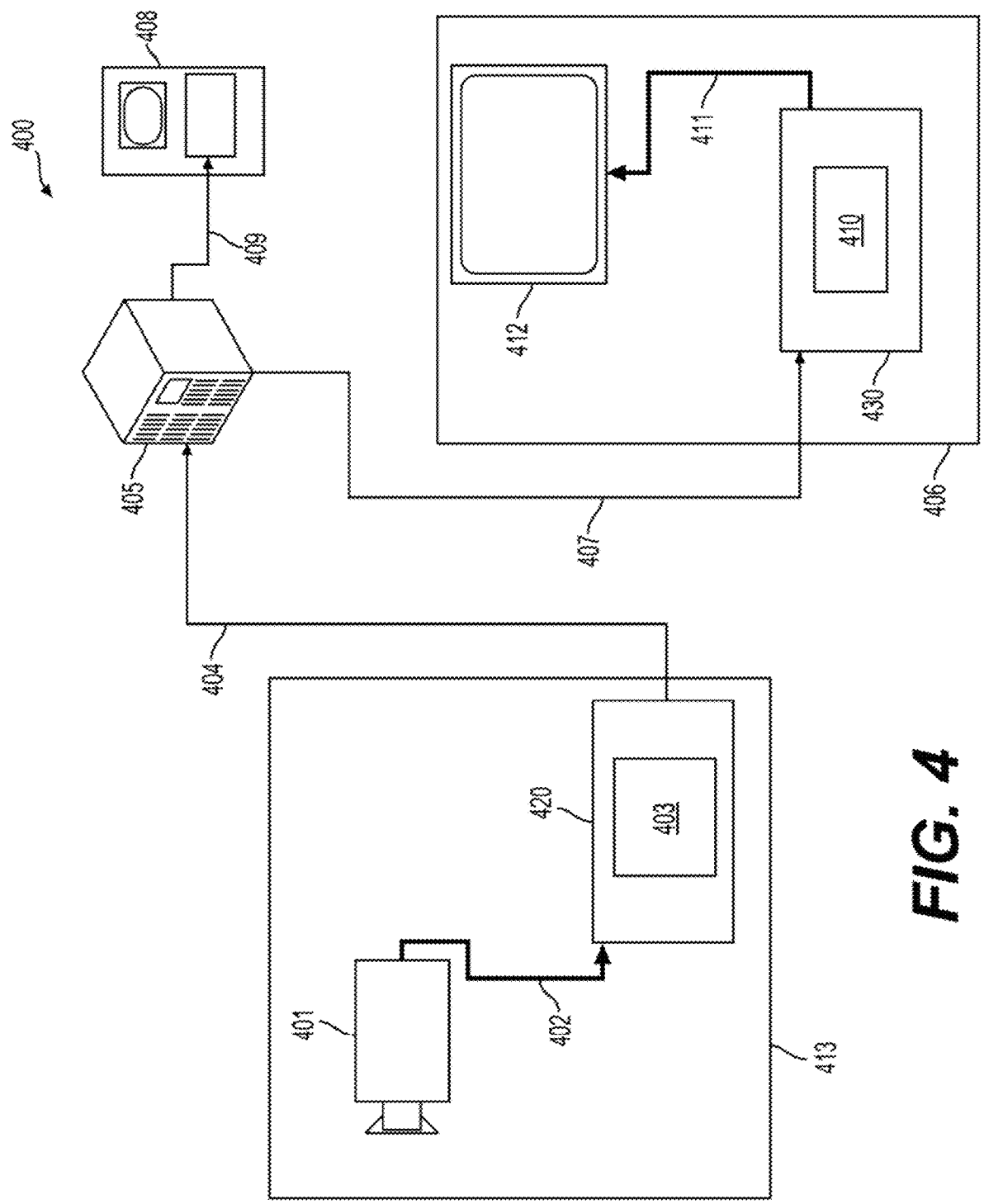
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
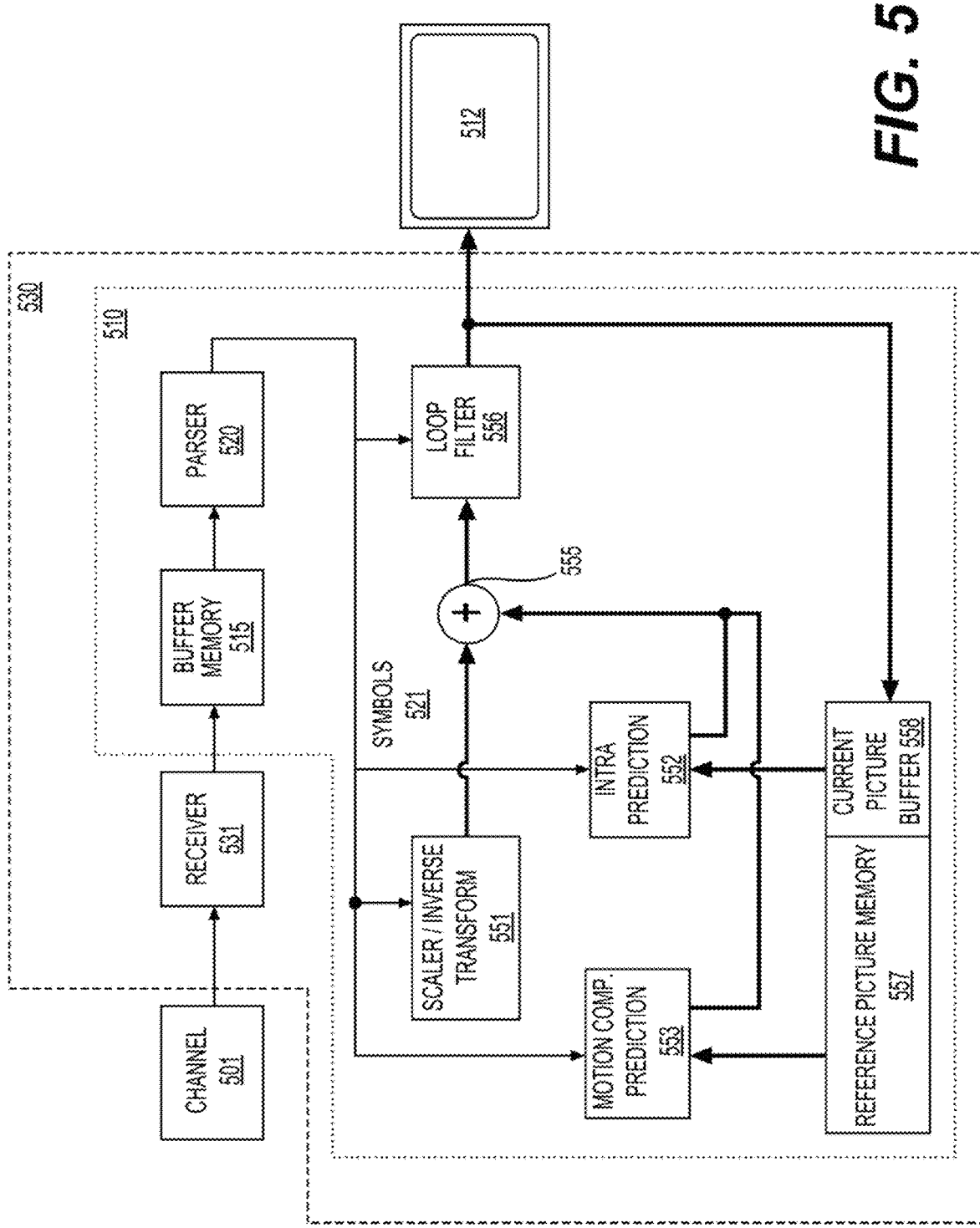
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
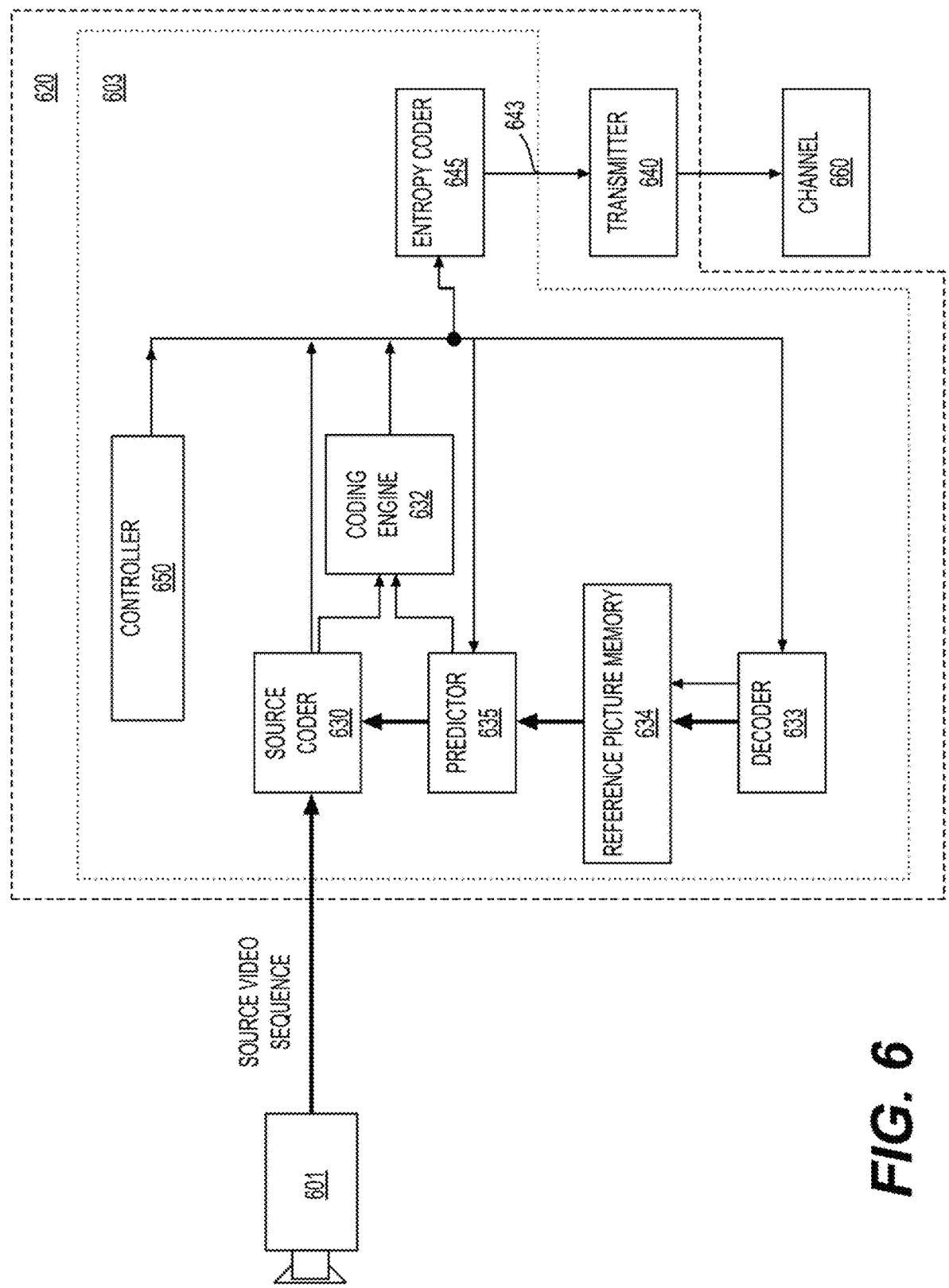
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
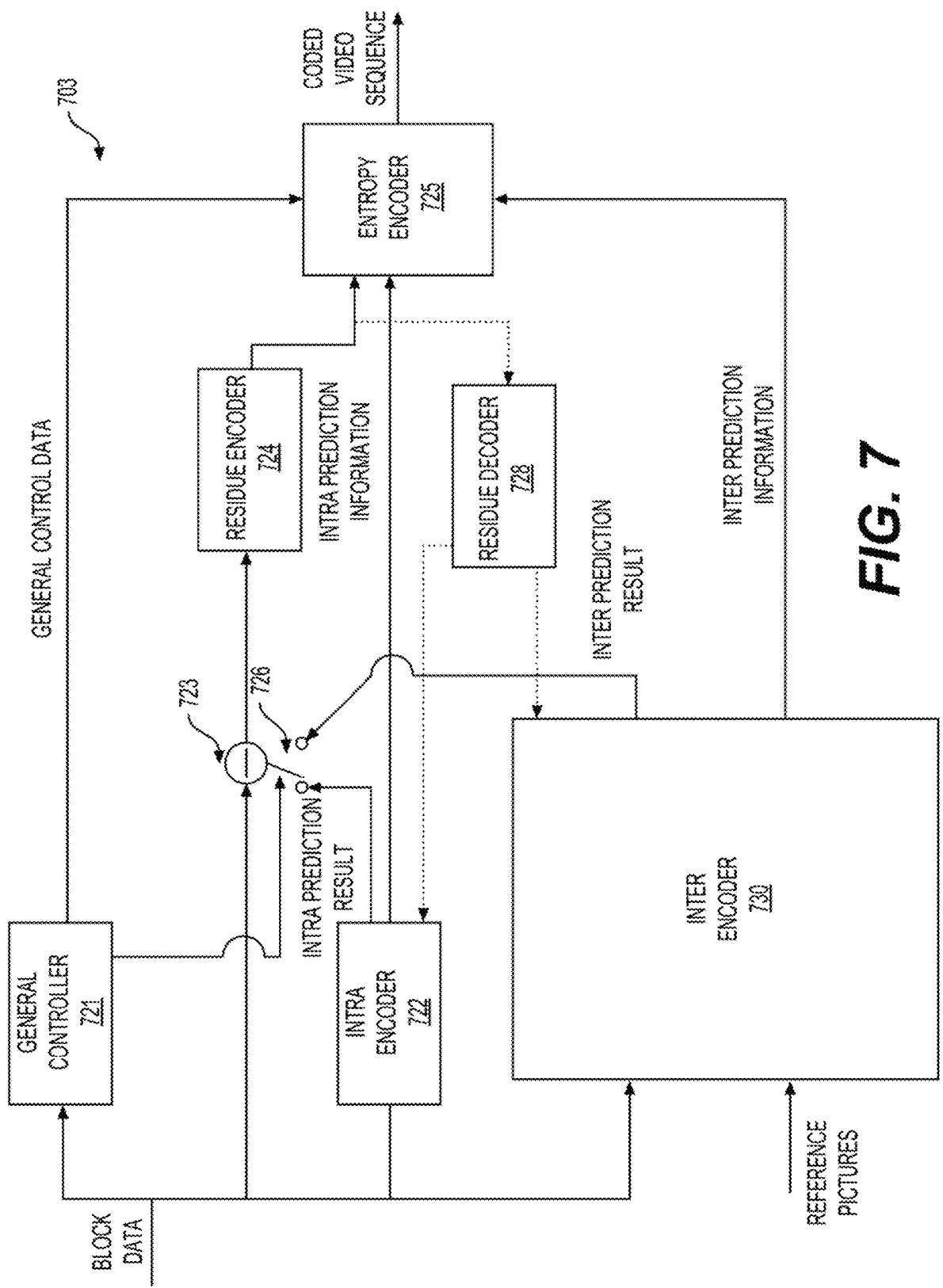
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
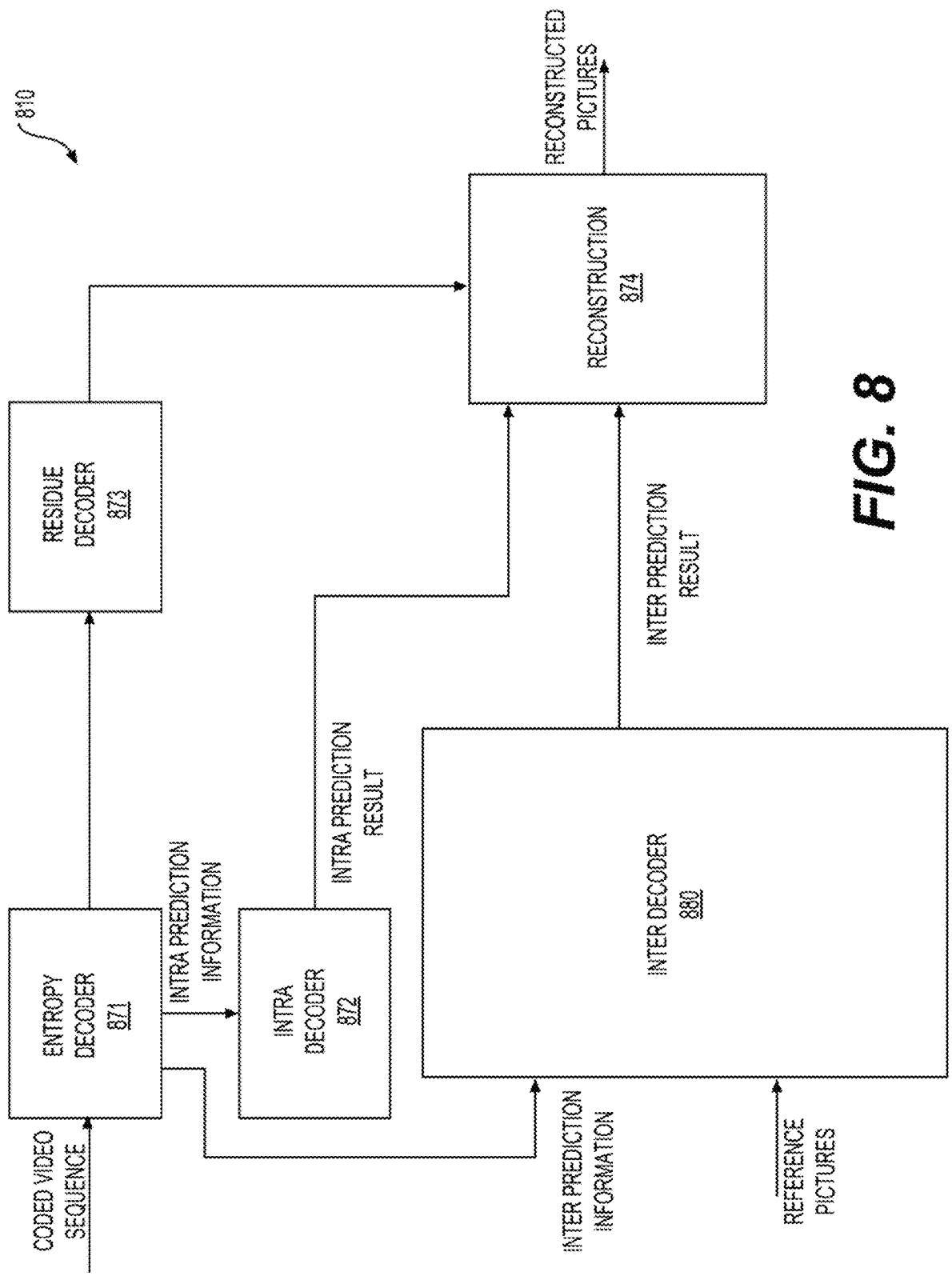
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques to use sub-block based merge mode for intra block copy (IBC).

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
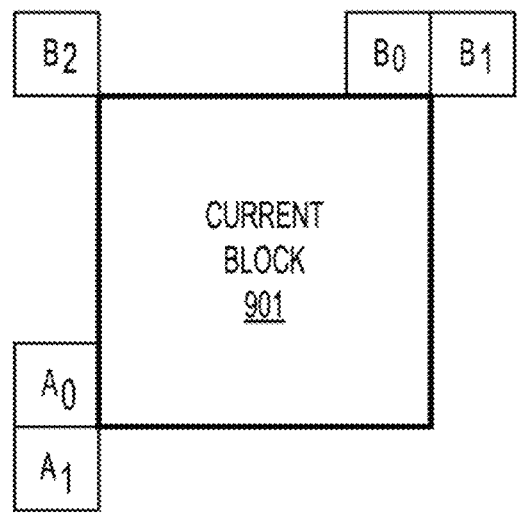
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
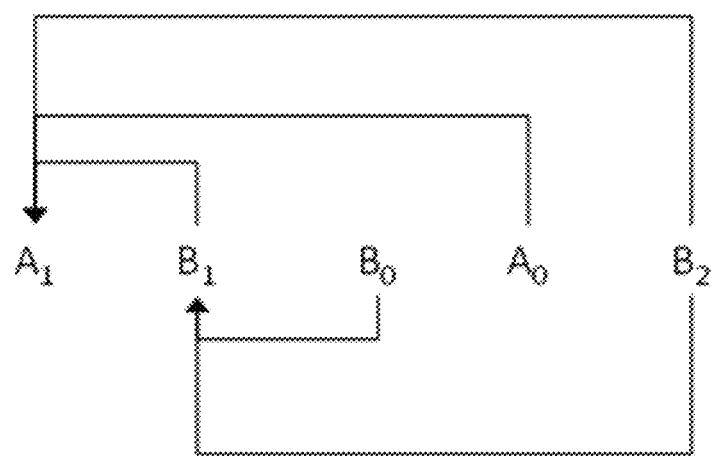
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
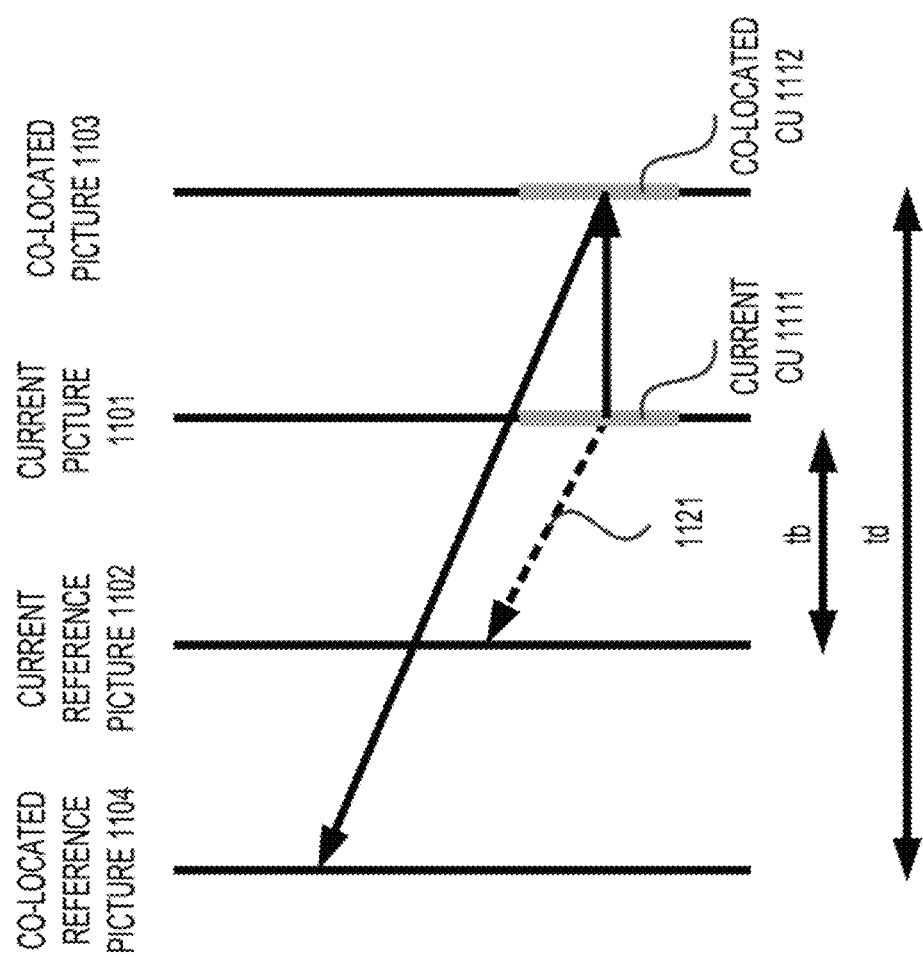
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a collocated reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the collocated reference picture (1104) of the co-located picture (1103) and the co-located picture (1103). A reference picture index of the temporal merge candidate can be set to zero.

FIG. 12 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

Figure 13A:
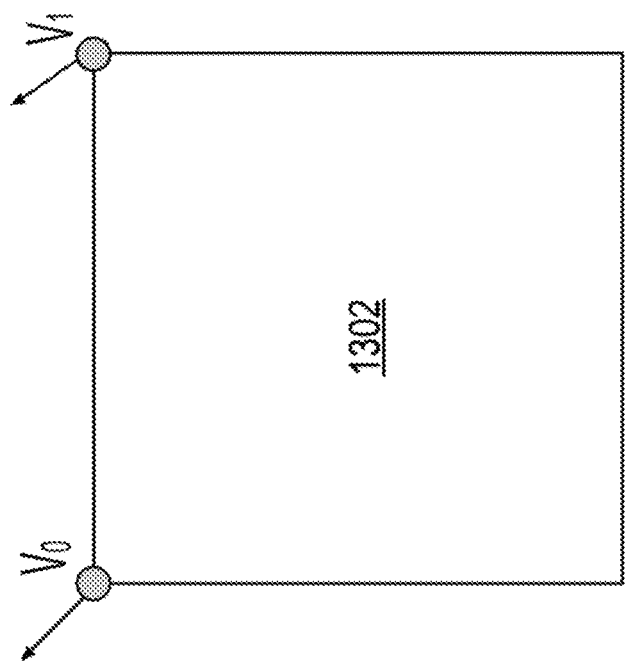
FIGS. 13A-13B show affine motion models in some examples.
Figure 13B:
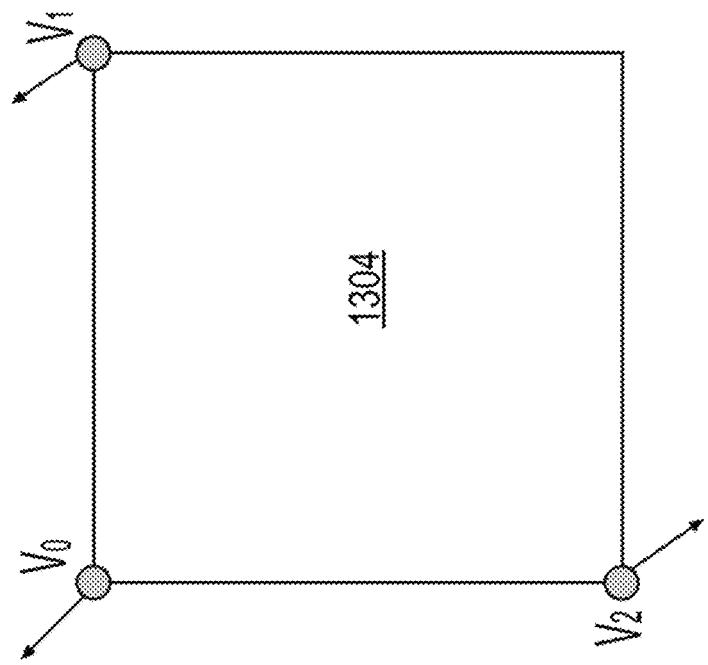

In HEVC, a translation motion model is applied for motion compensation prediction (MCP). While in the real world, many kinds of motions can exist, such as zoom in/out, rotation, perspective motions, and other irregular motions. A block-based affine transform motion compensation prediction can be applied, such as in VTM. FIG. 13A shows an affine motion field of a block (1302) described by motion information of two control points (4-parameter). FIG. 13B shows an affine motion field of a block (1304) described by three control point motion vectors (6-parameter).

As shown in FIG. 13A, in the 4-parameter affine motion model, a motion vector at a sample location (x, y) in the block (1302) can be derived in Eq. (1) as follows:

$$\begin{cases} mv_x = \dfrac{mv_{1x} - mv_{0x}}{W} x + \dfrac{mv_{1y} - mv_{0y}}{W} y + mv_{0x} \\ mv_y = -\dfrac{mv_{1y} - mv_{0y}}{W} x + \dfrac{mv_{1x} - mv_{0x}}{W} y + mv_{0y} \end{cases} \quad \text{Eq. (1)}$$

where $mv_x$ can be the motion vector in a first direction (or X direction) and $mv_y$ can be the motion vector in a second direction (or Y direction). The motion vector can also be described in Eq. (2):

$$\begin{cases} mv_x = ax + by + c \\ mv_y = -bx + ay + f \end{cases} \quad \text{Eq. (2)}$$

As shown in FIG. 13B, in the 6-parameter affine motion model, a motion vector at a sample location (x, y) in the block (1304) can be derived in Eq. (3) as follows:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad \text{Eq. (3)}$$

The 6-parameter affine motion model can also described in Eq. (4) as follows:

$$\begin{cases} mv_x = ax + by + c \\ mv_y = dx + ey + f \end{cases} \quad \text{Eq. (4)}$$

As shown in Eq. (1) and Eq. (3), ($mv_{0x}$, $mv_{0y}$) can be a motion vector of a top-left corner control point. ($mv_{1x}$, $mv_{1y}$) can be motion vector of a top-right corner control point. ($mv_{2x}$, $mv_{2y}$) can be a motion vector of a bottom-left corner control point.

Figure 14:
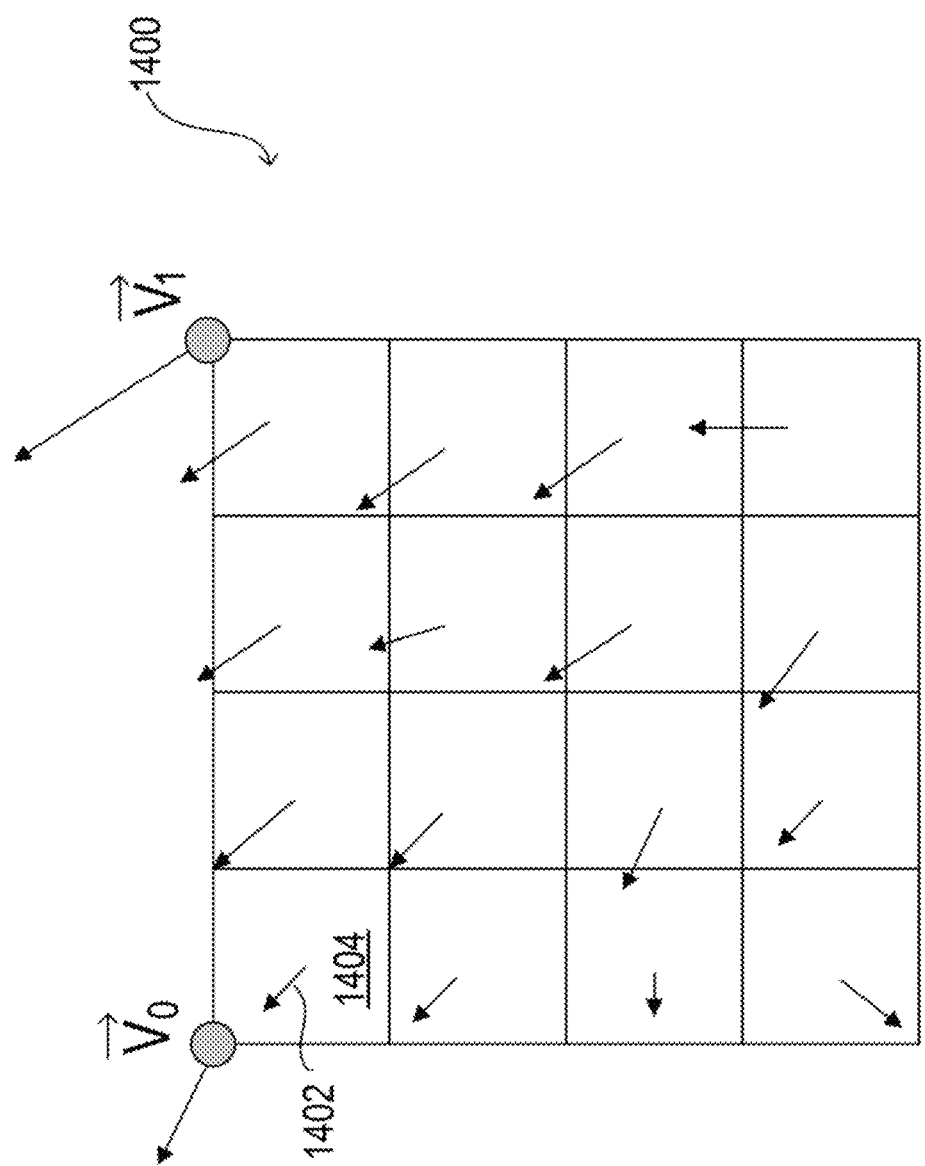
FIG. 14 shows affine model vector field in an example.

As shown in FIG. 14, to simplify the motion compensation prediction, block based affine transform prediction can be applied. To derive a motion vector of each 4×4 luma sub-block, a motion vector of a center sample (e.g., (1402)) of each sub-block (e.g., (1404)) in a current block (1400) can be calculated according to the equations (1)-(4), and rounded to 1/16 fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma subblocks.

In affine merge prediction, an affine merge (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to form the affine merge candidate list: (1) inherited affine merge candidates that are extrapolated from CPMVs of neighbour CUs, (2) constructed affine merge candidates with CPMVPs that are derived using translational MVs of neighbour CUs, and (3) Zero MVs.

Figure 15:
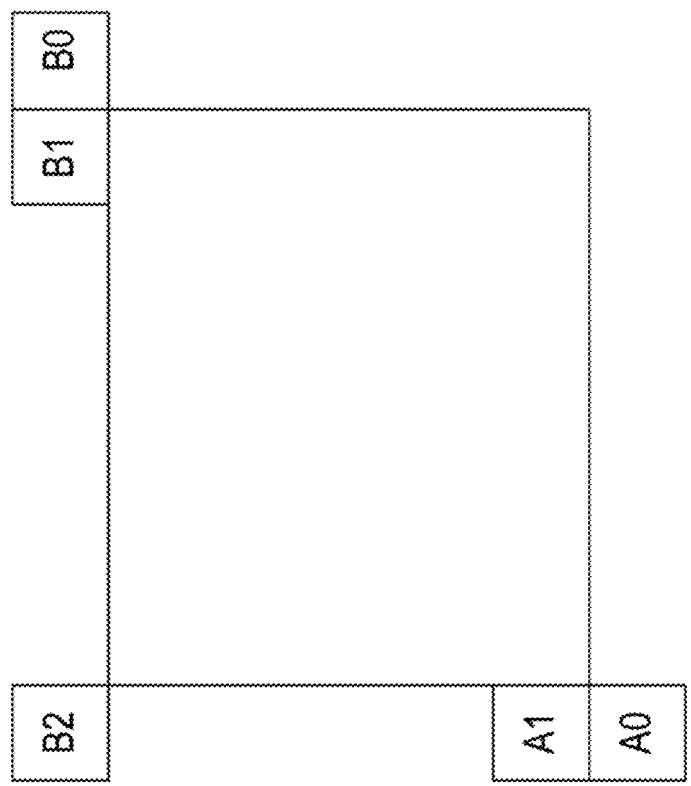
FIG. 15 shows positions of spatial merge candidates in some examples.
Figure 16:
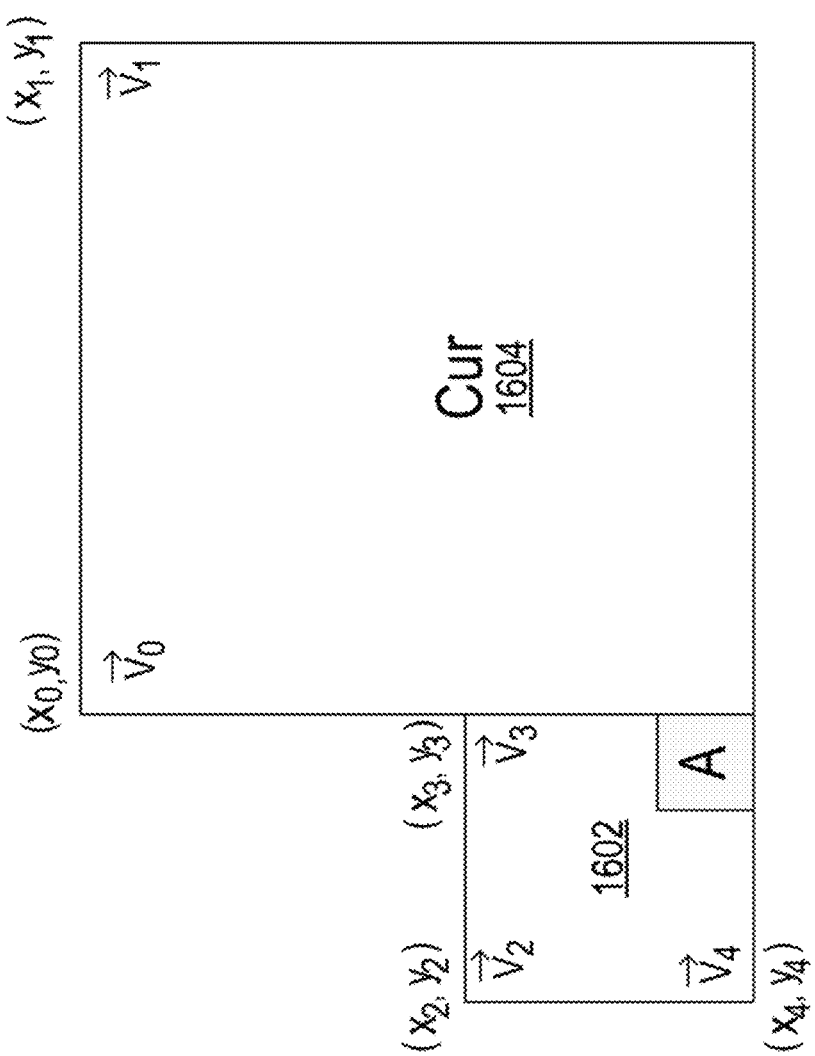
FIG. 16 shows control point motion vector inheritance in some examples.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 15. As shown in FIG. 15, for a left predictor (or a left inherited affine candidate), a scan order can be A0->A1, and for an above predictor (or an above inherited affine candidate), a scan order can be B0->B1->B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 16, when a neighboring left bottom block A of a current block (1604) is coded in affine mode, motion vectors $v_2$, $v_3$ and $v_4$ of a top left corner, an above right corner, and a left bottom corner of a CU (1602) which contains the block A can be attained. When the block A is coded with 4-parameter affine model, two CPMVs of the current CU (1604) can be calculated according to $v_2$, and $v_3$ of the CU (1602). In a case that block A is coded with a 6-parameter affine model, three CPMVs of the current CU (1604) can be calculated according to $v_2$, $v_3$ and $v_4$ of the CU (1602).

Figure 17:
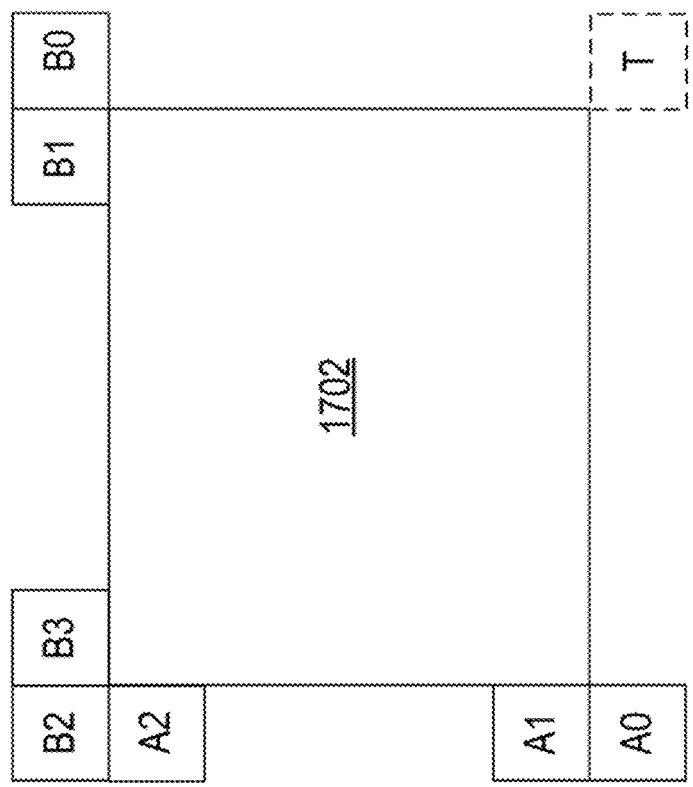
FIG. 17 shows candidate positions for construed affine merge mode in some examples.

A constructed affine candidate of a current block can be a candidate that is constructed by combining neighbor translational motion information of each control point of the current block. The motion information of the control points can be derived from specified spatial neighbors and a temporal neighbor that can be shown in FIG. 17. As shown in FIG. 17, CPMVK (k=1, 2, 3, 4) represents a k-th control point of a current block (1702). For CPMV1, B2->B3->A2 blocks can be checked and an MV of the first available block can be used. For CPMV2, B1->B0 blocks can be checked. For CPMV3, A1->A0 blocks can be checked. TMVP can be used as CPMV4 if CPM4 is not available.

After MVs of four control points are attained, affine merge candidates can be constructed for the current block (1702) based on motion information of the four control points. For example, the affine merge candidates can be constructed based on combinations of the MVs of the four control points in an order as follows: {CPMV1, CPMV2, CPMV3}, {CPMV1, CPMV2, CPMV+}, {CPMV1, CPMV3, CPMV4}, {CPMV2, CPMV3, CPMV+}, {CPMV1, CPMV2}, and {CPMV1, CPMV3}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After inherited affine merge candidates and constructed affine merge candidate are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUS,
(2) Constructed affine AMVP candidates with CPMVPs that are derived using the translational MVs of the neighbour CUS,
(3) Translational MVs from neighboring CUs, and
(4) Zero MVs.

A checking order of inherited affine AMVP candidates can be the same as a checking order of inherited affine merge candidates. To determine an AVMP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 17, the same checking order can be applied as the checking order in affine merge candidate construction. In addition, a reference picture index of a neighboring block can also be checked. A first block in the checking order can be inter coded and have the same reference picture as the current CU (1702). One constructed AMVP candidate can be determined when the current CU (1702) is coded with a 4-parameter affine mode, and $mv_0$ and $mv_1$ are both available. The constructed AMPV candidate can further be added to the affine AMVP list. When the current CU (1702) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, $mv_0$, $mv_1$ and $mv_2$ can be added, in order. The $mv_0$, $mv_1$ and $mv_2$ can function as translational MVs to predict all control point MVs of the current CU (e.g., (1702)) when available. Finally, zero MVs can be used to fill the affine AMVP list if the affine AMVP is still not full.

Subblock-based affine motion compensation can save memory access bandwidth and reduce computation complexity compared to pixel based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction/(i, j).

Step (2): spatial gradients $g_x(i, j)$ and $g_y(i, j)$ of the subblock prediction can be calculated at each sample location using a 3-tap filter [−1, 0, 1]. The gradient calculation can be the same as gradient calculation in BDOF. For example, the spatial gradients $g_x(i, j)$ and $g_y(i, j)$ can be calculated based on Eq. (5) and Eq. (6) respectively.

$$g_x(i,j)=(I(i+1,j)\text{>>shift1})-(I(i-1,j)\text{>>shift1}) \qquad \text{Eq. (5)}$$

$$g_y(i,j)=(I(i,j+1)\text{>>shift1})-(I(i,j-1)\text{>>shift1}) \qquad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 18:
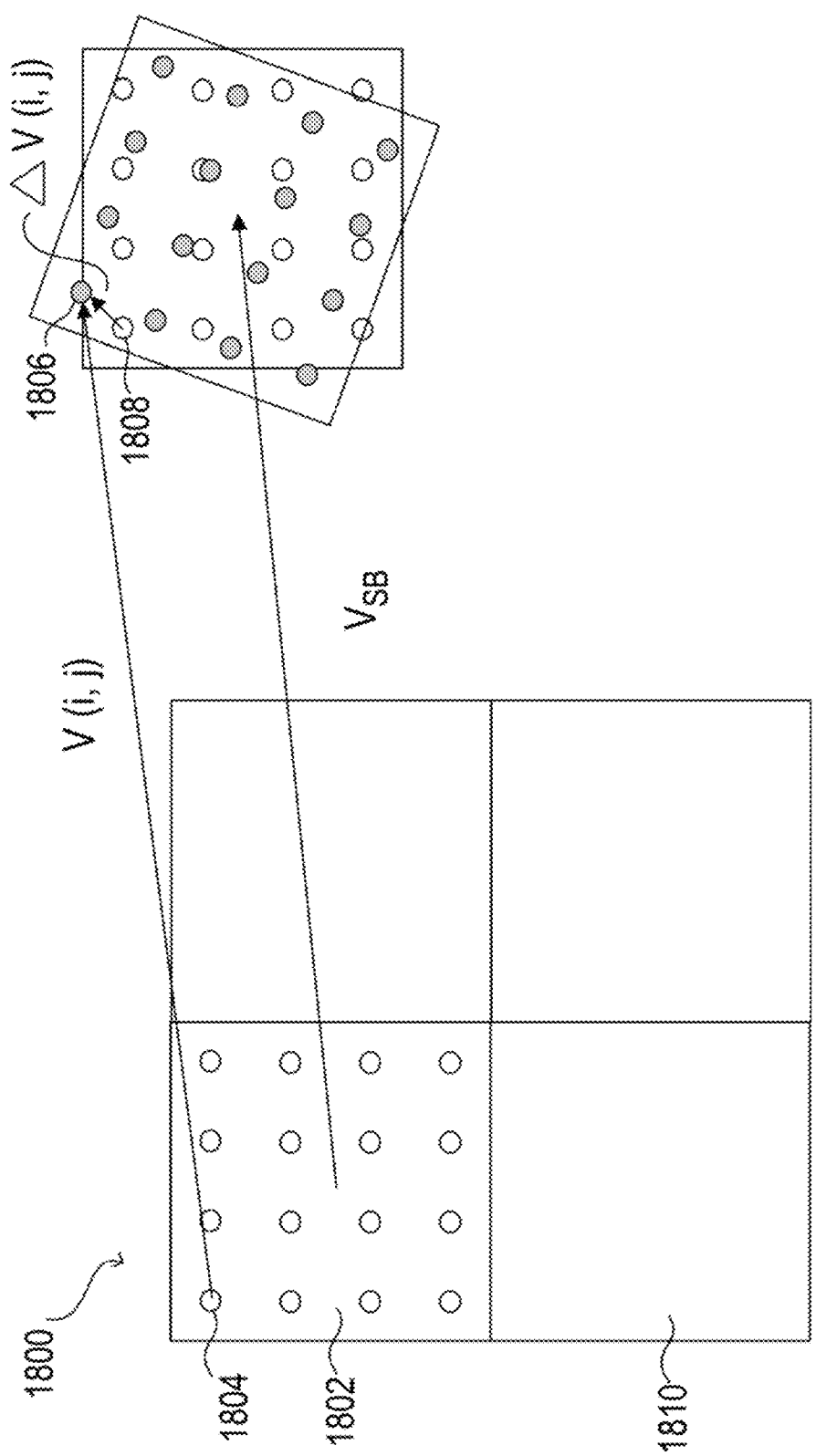
FIG. 18 shows an exemplary illustration of the difference between the sample MV and the subblock MV in some examples.

Step (3): luma prediction refinement can be calculated by an optical flow equation as shown in Eq. (7).

$$\Delta I(i,j)=g_x(i,j)*\Delta v_x(i,j)+g_y(i,j)*\Delta v_y(i,j) \qquad \text{Eq. (7)}$$

where $\Delta v$ (i, j) can be a difference between a sample MV computed for a sample location (i, j), denoted by v (i, j), and a subblock MV, denoted by $v_{SB}$, of a subblock to which the sample (i, j) belongs. FIG. 18 shows an exemplary illustration of the difference between the sample MV and the subblock MV. As shown in FIG. 18, a subblock (1802) can be included in a current block (1800) and a sample (1804) can be included in the subblock (1802). The sample (1804) can include a sample motion vector v (i, j) that corresponds to a reference pixel (1806). The subblock (1802) can include a subblock motion vector $v_{SB}$. Based on the subblock motion vector $v_{SB}$, the sample (1804) can correspond to a reference pixel (1808). A difference between the sample MV and the subblock MV, denoted by $\Delta v$ (i, j), can be indicated by a difference between the reference pixel (1806) and the reference pixel (1808). The $\Delta v$ (i, j) can be quantized in a unit of 1/32 luma sample precision.

Since affine model parameters and a sample location relative to a subblock center may not be changed from a subblock to another subblock, $\Delta v(i, j)$ can be calculated for a first subblock (e.g., (1802)), and reused for other subblocks (e.g., (1810)) in the same CU (e.g., (1800)). Let dx(i, j) be a horizontal offset and dy(i, j) be a vertical offset from a sample location (i, j) to a center of a subblock ($x_{SB}$, $y_{SB}$), $\Delta v(x, y)$ can be derived by Eq. (8) and Eq. (9) as follows:

$$\begin{cases} dx(i, j) = i - x_{SB} \\ dy(i, j) = j - y_{SB} \end{cases} \qquad \text{Eq. (8)}$$

$$\begin{cases} \Delta v_x(i, j) = C * dx(i, j) + D * dy(i, j) \\ \Delta v_y(i, j) = E * dx(i, j) + F * dy(i, j) \end{cases} \qquad \text{Eq. (9)}$$

In order to keep accuracy, the center of the subblock ($x_{SB}$, $y_{SB}$) can be calculated as (($W_{SB}$−1)/2, ($H_{SB}$−1)/2), where $W_{SB}$ and $H_{SB}$ are the subblock width and height, respectively.

Once $\Delta v$ (x, y) is obtained, parameters of the affine model can be obtained. For example, for a 4-parameter affine model, the parameters of the affine model can be shown in Eq. (10).

$$\begin{cases} C = F = \dfrac{v_{1x} - v_{0x}}{w} \\ E = -D = \dfrac{v_{1y} - v_{0y}}{w} \end{cases} \qquad \text{Eq. (10)}$$

For a 6-parameter affine model, the parameters of the affine model can be shown in Eq. (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad \text{Eq. (11)}$$

where ($v_{0x}$, $v_{0y}$), ($v_{1x}$, $v_{1y}$), ($v_{2x}$, $v_{2y}$) can be a top-left control point motion vector, a top-right control point motion vector, and a bottom-left control point motion vector respectively, and w and h can be a width and a height of the CU respectively.

Step (4): finally, the luma prediction refinement $\Delta I(i, j)$ can be added to the subblock prediction I (i, j). A final prediction I' can be generated as shown in Eq. (12).

$$I'(i,j)=I(i,j)+\Delta I(i,j) \qquad \text{Eq. (12)}$$

PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated picture for each subblock in the current CU that is in the current picture. If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated picture can be used to improve MV prediction and a merge mode for CUs in the current picture. In an example, the same collocated picture used by the TMVP mode is used in the SbTVMP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated picture (e.g., the collocated block is the bottom-right or a center block relative to the current CU) while the SbTMVP mode can apply a motion shift before fetching the temporal motion information from the collocated picture. In an example, the motion shift used in the SbTMVP mode is obtained from an MV of one of spatial neighboring blocks of the current CU.

Figure 19:
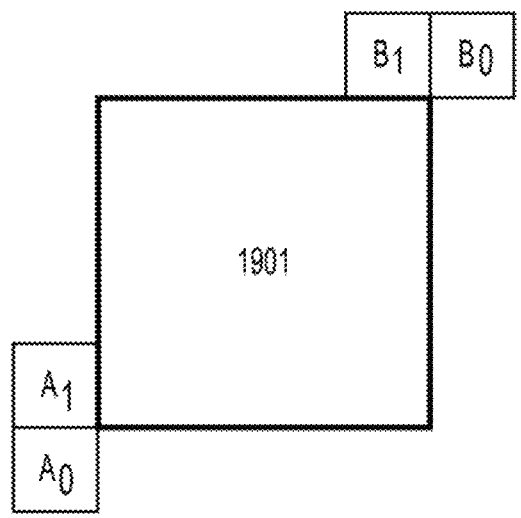
FIGS. 19-20 show an exemplary SbTMVP process used in the SbTMVP mode.
Figure 20:
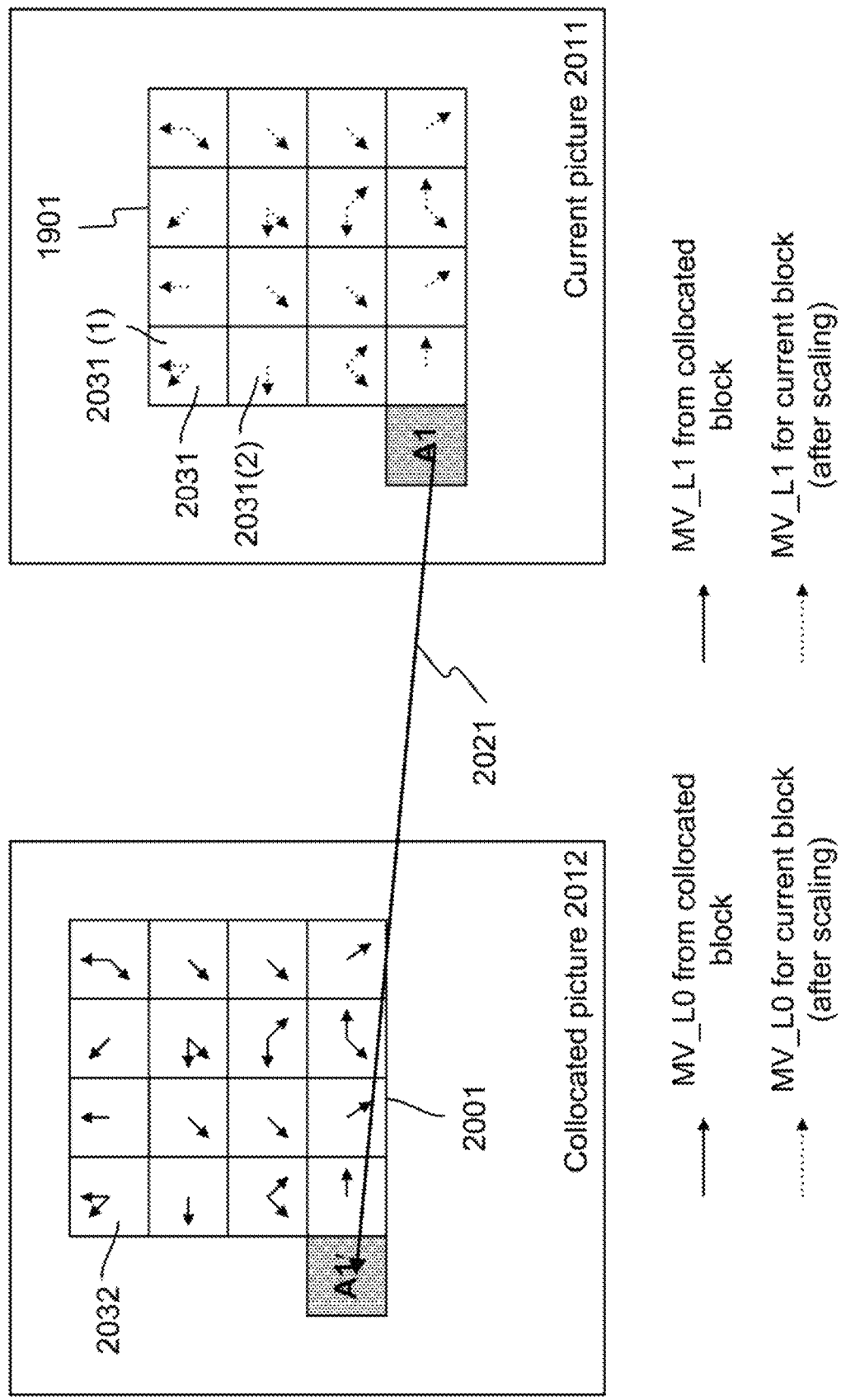

FIGS. 19-20 show an exemplary SbTMVP process used in the SbTMVP mode. The SbTMVP process can predict MVs of sub-CUs (e.g., subblocks) within a current CU (e.g., a current block) (1901) in a current picture (2011), for example, in two steps. In the first step, a spatial neighbor (e.g., A1) of the current block (1901) in FIGS. 19-20 is examined. If the spatial neighbor (e.g., A1) has an MV (2021) that uses a collocated picture (2012) as a reference picture of the spatial neighbor (e.g., A1), the MV (2021) can be selected to be a motion shift (or a DV) to be applied to the current block (1901). If no such MV (e.g., an MV that uses the collocated picture (2012) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (2021) identified in the first step can be applied to the current block (1901) (e.g., the DV (2021) is added to coordinates of the current block) to obtain sub-CU level motion information (e.g., including MVs and reference indices) from the collocated picture (2012). In the example shown in FIG. 20, the motion shift or the DV (2021) is set to be the MV of the spatial neighbor A1 (e.g., a block A1) of the current block (1901). For each sub-CU or subblock (2031) in the current block (1901), motion information of a corresponding collocated block (2001) (e.g., motion information of the smallest motion grid that covers a center sample of the collocated block (2001)) in the collocated picture (2012) can be used to derive the motion information for the sub-CU or subblock (2031). After the motion information of the collocated sub-CU (2032) in the collocated block (2001) is identified, the motion information of the collocated sub-CU (2032) can be converted to the motion information (e.g., MV(s) and one or more reference indices) of the current sub-CU (2031), for example, using a scaling method, such as in a similar way as the TMVP process used in HEVC, where temporal motion scaling is applied to align reference pictures of temporal MVs to reference pictures of a current CU.

The motion field of the current block (1901) derived based on the DV (2021) can include motion information of each subblock (2031) in the current block (1901), such as MV(s) and one or more associated reference indices. The motion field of the current block (1901) can also be referred to as an SbTMVP candidate and corresponds to the DV (2021).

FIG. 20 shows an example of the motion field or the SbTMVP candidate of the current block (1901). The motion information of the subblock (2031(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (2031(2)) that is uni-predicted includes an MV and an index indicating a reference picture in L0 or L1.

In an example, the DV (2021) is applied to a central position of the current block (1901) to locate a displaced central position in the collocated picture (2012). If a block including the displaced central position is not inter-coded, the SbTMVP candidate is considered not available. Otherwise, if a block (e.g., the collocated block (2001)) including the displaced central position is inter-coded, the motion information of the central position of the current block (1901), referred to as central motion of the current block (1901), can be derived from motion information of the block including the displaced central position in the collocated picture (2012). In an example, a scaling process can be used to derive the central motion of the current block (1901) from the motion information of the block including the displaced central position in the collocated picture (2012). When the SbTMVP candidate is available, the DV (2021) can be applied to find the corresponding subblock (2032) in the collocated picture (2012) for each subblock (2031) of the current block (1901). The motion information of the corresponding subblock (2032) can be used to derive the motion information of the subblock (2031) in the current block (1901), such as in the same way used to derive the central motion of the current block (1901). In an example, if the corresponding subblock (2032) is not inter-coded, the motion information of the current subblock (2031) is set to be the central motion of the current block (1901).

Some video coding standards, such as HEVC and AVC/H.264, use a fixed motion vector resolution of quarter luma sample. According to an aspect of the disclosure, an optimum trade-off between displacement vector rate and prediction error rate has to be chosen to achieve overall rate-distortion optimality. Some video coding standards, such as VVC, allow to select the motion vector resolution at coding block level and, therefore, to trade-off bit rate versus fidelity for the signaling of the motion parameters. Specifically, VVC enables adaptive motion vector resolution (AMVR) in the AMVR mode. The AMVR mode is signaled at the coding block level if at least one component of an MVD is not equal to zero. The motion vector predictor is rounded to a given resolution such that the resulting motion vector is guaranteed to fall on a grid of the given resolution. For each given resolution, a number of shifting bits (denoted by AmvrShift) for motion vector difference is defined to specify the resolution of the motion vector difference with the left shifting operation with AmvrShift-bit. The given motion vector differences, denoted as MvdL0 and MvdL1 in AMVP mode and MvdCpL0, and MvdCpL1 in affine AMVP mode, are modified when AMVR mode is enable.

FIG. 21 shows a table to determine the number of shifting bits AmvrShift according to the flags and/or syntaxes.

FIG. 22 shows a portion of VVC standard that modifies motion vector differences in the AMVP mode and the affine AMVP mode when AMVR mode is enabled.

Intra block copy (IBC) is a coding tool that is used in some video standard, such as HEVC extensions on screen content coding (SCC). IBC can significantly improve the coding efficiency of screen content materials. IBC mode can be implemented as a block level coding mode, and block matching (BM) can be performed at the encoder side to find the optimal block vector (or motion vector) for each CU. A block vector is used to indicate the displacement from the current block to a reference block, which is already reconstructed inside the current picture.

In some examples, the luma block vector of an IBC-coded CU is in integer precision, and the chroma block vector rounds to integer precision as well. In some examples, the IBC mode can be combined with AMVR, for example, the IBC mode can switch between 1-pel and 4-pel motion vector precisions.

In some examples, an IBC-coded CU is treated as the third prediction mode other than the intra prediction mode or inter prediction mode. The IBC mode is applicable to the CUS with both width and height smaller than or equal to 64 luma samples.

In some examples, at the encoder side, hash-based motion estimation is performed for IBC. In an example, the encoder performs rate distortion (RD) check for blocks with either width or height no larger than 16 luma samples. For non-merge mode, the block vector search is performed using hash based search first. If hash based search does not return valid candidate, block matching based local search can be performed.

In some examples, in the hash based search, hash key matching (e.g., 32-bit CRC) between the current block and a reference block is extended to all allowed block sizes. The hash key calculation for every position in the current picture is based on 4×4 subblocks. For the current block of a larger size (larger than 4×4), a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum block vector cost can be selected as the final reference block.

In some examples, in the block matching based local search, the search range is set to cover both the previous and current CTUs.

In some examples, IBC mode is signalled with a flag at CU level, and further the IBC mode can be signaled as IBC AMVP mode or IBC skip/merge mode.

For the IBC skip/merge mode, a merge candidate index is used to indicate which of the block vectors in the list from neighboring candidate IBC coded blocks is used to predict the current block. The merge list consists of spatial, HMVP, and pairwise candidates.

For the IBC AMVP mode, block vector difference is coded in the same way as a motion vector difference. The block vector prediction can use two candidates as predictors, one from left neighbor and one from above neighbor (if IBC coded). When either neighbor is not available, a default block vector can be used as a predictor. A flag is signaled to indicate the block vector predictor index.

According to an aspect of the disclosure, to reduce memory consumption and decoder complexity, the IBC in some examples (e.g., VVC) allows only the reconstructed portion of the predefined area including the region of current CTU and some region of the left CTU to be IBC reference region.

FIGS. 23A-23D show examples of reference region in intra block copy according to an embodiment of the disclosure. Referring to FIGS. 23A-D, a current picture (2301) includes a current CTB (2315) under reconstruction and a previously reconstructed CTB (2310) that is a left neighbor of the current CTB (2315). CTBs in the current picture (2301) have a CTB size and a CTB width. The current CTB (2315) includes 4 regions (2316)-(2319). Similarly, the previously reconstructed CTB (2310) includes 4 regions (2311)-(2314). In an embodiment, the CTB size is a maximum CTB size and is equal to a reference memory size. In an example, the CTB size and the reference memory size are 128 by 128 samples, and thus, each of the regions (2311)-(2314) and (2316)-(2319) has a size of 64 by 64 samples.

In the examples illustrated in FIGS. 23A-D, the current CTB (2315) includes a top left region, a top right region, a bottom left region, and a bottom right region that correspond to the regions (2316)-(2319), respectively. The previously reconstructed CTB (2310) includes a top left region, a top right region, a bottom left region, and a bottom right region that correspond to the regions (2311)-(2314), respectively.

Figure 23A:
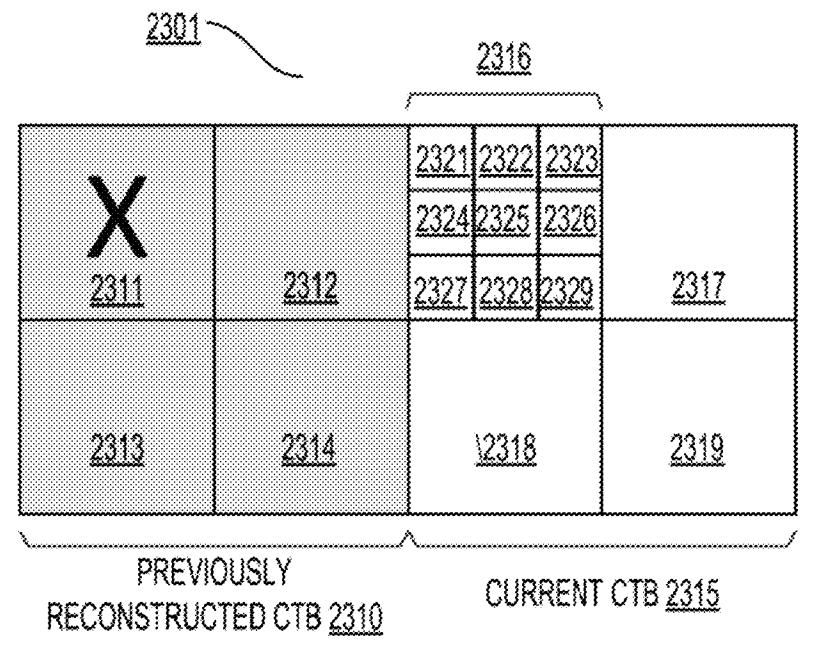

Referring to FIG. 23A, the current region (2316) is under reconstruction. The current region (2316) can include a plurality of coding blocks (2321)-(2329). The current region (2316) has a collocated region, i.e., the region (2311), in the previously reconstructed CTB (2310). An IBC reference region for one of the coding blocks (2321)-(2329) to be reconstructed can exclude the collocated region (2311). The IBC reference region can include the regions (2312)-(2314) of the previously reconstructed CTB (2310) that are reconstructed after the collocated region (2311) and before the current region (2316) in a decoding order.

Referring to FIG. 23A, a position of the collocated region (2311) is offset by the CTB width, such as 128 samples, from a position of the current region (2316). For example, the position of the collocated region (2311) is left shifted by 128 samples from the position of the current region (2316).

Referring again to FIG. 23A, when the current region (2316) is the top left region of the current CTB (2315), the collocated region (2311) is the top left region of the previously reconstructed CTB (2310), and the search region excludes the top left region of the previously reconstructed CTB.

As shown in FIG. 23A, current block falls into the top-left 64×64 block (e.g., the current region (2316)) of the current CTU (e.g., shown by CTB (2315)), then in addition to the already reconstructed samples in the current CTU (shown by CTB (2315)), samples in the bottom-right 64×64 blocks (e.g., shown by (2314)) of the left CTU (e.g., shown by CTB (2310) can be referred to as reference samples for example using current picture referencing (CPR) mode. The current block can also refer to the samples in the bottom-left 64×64 block (e.g., shown by (2313)) of the left CTU (e.g., shown by CTB (2310)) and the samples in the top-right 64×64 block (e.g., shown by (2312)) of the left CTU (e.g., shown by CTB (2310), using CPR mode.

Figure 23B:
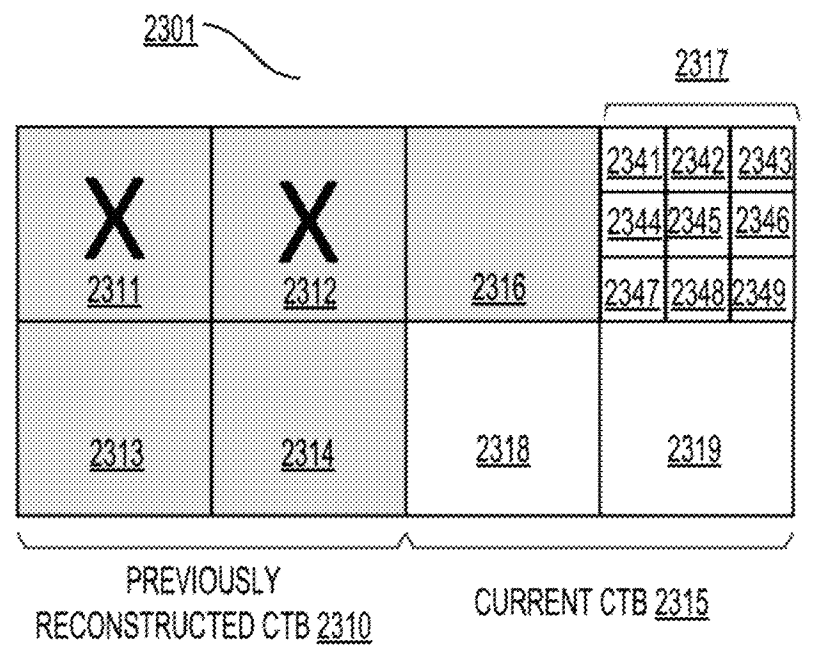

Referring to FIG. 23B, the current region (2317) is under reconstruction. The current region (2317) can include a plurality of coding blocks (2341)-(2349). The current region (2317) has a collocated region (i.e., the region (2312), in the previously reconstructed CTB (2310)). An IBC reference region for one of the plurality of coding blocks (2341)-(2349) can exclude the collocated region (2312). The IBC reference region includes the regions (2313)-(2314) of the previously reconstructed CTB (2310) and the region (2316) in the current CTB (2315) that are reconstructed after the collocated region (2312) and before the current region (2317). The IBC reference region further excludes the region (2311) due to constraint of the reference memory size (i.e., one CTB size). Similarly, a position of the collocated region (2312) is offset by the CTB width, such as 128 samples, from a position of the current region (2317).

In the FIG. 23B example, the current region (2317) is the top right region of the current CTB (2315), the collocated region (2312) is also the top right region of the previously reconstructed CTB (2310), and the search region excludes the top right region of the previously reconstructed CTB (2310).

As shown in FIG. 23B, if current block falls into the top-right 64×64 block (e.g., shown by (2317) of the current CTU (e.g., shown by CTB (2315)), then in addition to the already reconstructed samples (e.g., shown by (2316)) in the current CTU, if luma location (0, 64) relative to the current CTU has not yet been reconstructed, the current block can also refer to the samples in the bottom-left 64×64 block (e.g., shown as (2313)) and bottom-right 64×64 block (e.g., shown as (2314)) of the left CTU, using CPR mode; otherwise, the current block can also refer to reference samples in bottom-right 64×64 block (e.g., shown as (2314)) of the left CTU.

Figure 23C:
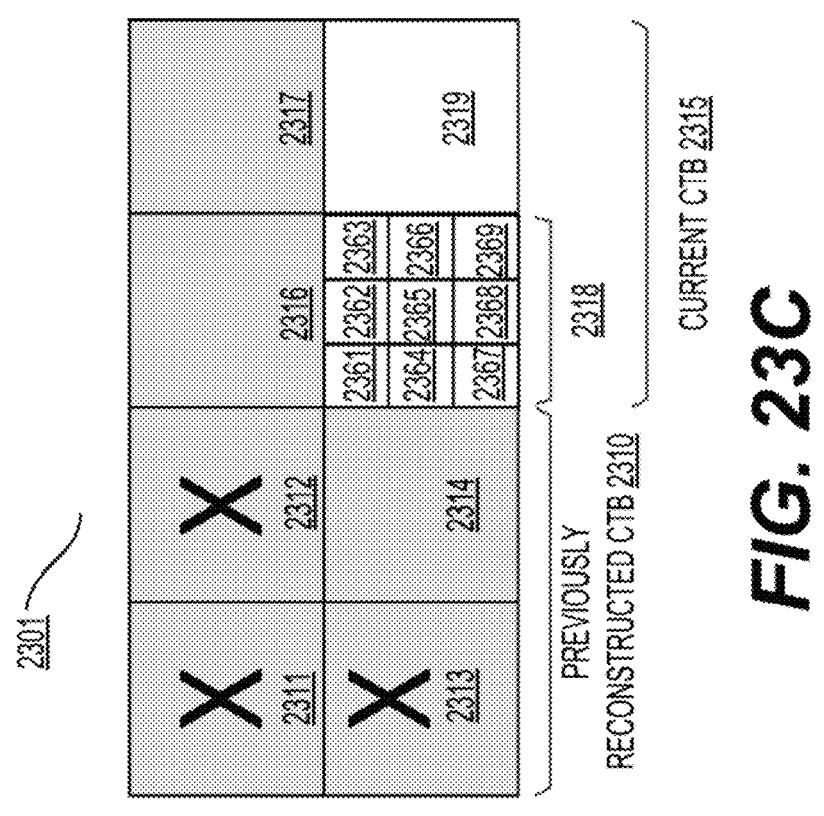

Referring to FIG. 23C, the current region (2318) is under reconstruction. The current region (2318) can include a plurality of coding blocks (2361)-(2369). The current region (2318) has a collocated region (i.e., the region (2313)), in the previously reconstructed CTB (2310). An IBC reference region for one of the plurality of coding blocks (2361)-(2369) can exclude the collocated region (2313). The IBC reference region includes the region (2314) of the previously reconstructed CTB (2310) and the regions (2316)-(2317) in the current CTB (2315) that are reconstructed after the collocated region (2313) and before the current region (2318). Similarly, the IBC reference region further excludes the regions (2311)-(2312) due to constraint of the reference memory size. A position of the collocated region (2313) is offset by the CTB width, such as 128 samples, from a position of the current region (2318). In the FIG. 23C example, when the current region (2318) is the bottom left region of the current CTB (2315), the collocated region (2313) is also the bottom left region of the previously reconstructed CTB (2310), and the search region excludes the bottom left region of the previously reconstructed CTB (2310).

As shown in FIG. 23C, if current block falls into the bottom-left 64×64 block (e.g., shown by (2318)) of the current CTU (e.g., shown by CTB (2315)), then in addition to the already reconstructed samples (e.g., (2316) and (2317)) in the current CTU, if luma location (64, 0) relative to the current CTU has not yet been reconstructed, the current block can also refer to the samples in the bottom-right 64×64 block (e.g., shown by (2314)) of the left CTU, using CPR mode.

Figure 23D:
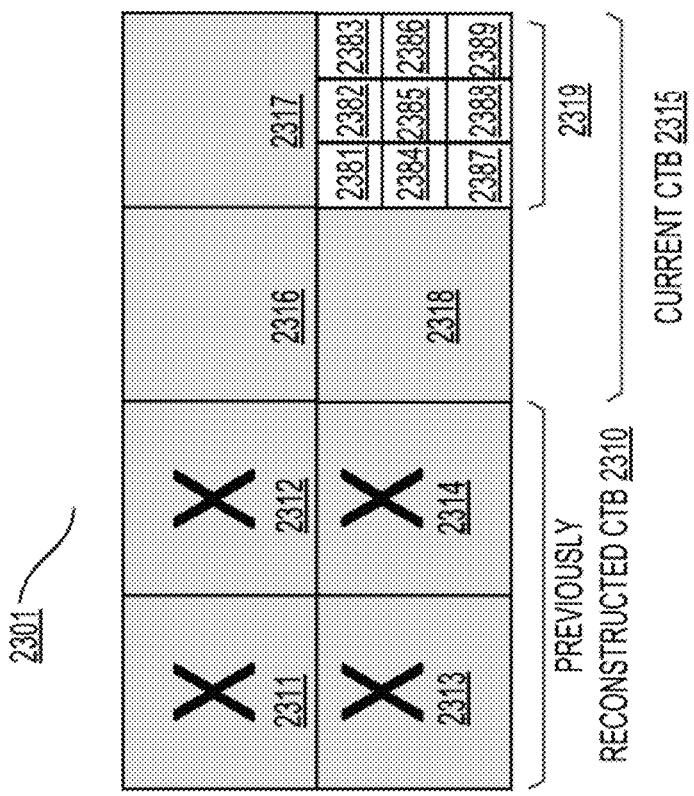

Referring to FIG. 23D, the current region (2319) is under reconstruction. The current region (2319) can include a plurality of coding blocks (2381)-(2389). The current region (2319) has a collocated region (i.e., the region (2314)), in the previously reconstructed CTB (2310). A IBC reference region for one of the plurality of coding blocks (2381)-(2389) can exclude the collocated region (2314). The IBC reference region includes the regions (2316)-(2318) in the current CTB (2315) that are reconstructed after the collocated region (2314) and before the current region (2319) in a decoding order. The IBC reference region excludes the regions (2311)-(2313) due to constraint of the reference memory size, and thus, the IBC reference region excludes the previously reconstructed CTB (2310). Similarly, a position of the collocated region (2314) is offset by the CTB width, such as 128 samples, from a position of the current region (2319). In the FIG. 23D example, when the current region (2319) is the bottom right region of the current CTB (2315), the collocated region (2314) is also the bottom right region of the previously reconstructed CTB (2310) and the search region excludes the bottom right region of the previously reconstructed CTB (2310).

In FIG. 23D, current block falls into the bottom-right 64×64 block (shown by (2319)) of the current CTU, it can only refer to the already reconstructed samples (e.g., (2316), (2317) and (2318) in the current CTU, using CPR mode.

Using the restriction shown in FIG. 23A-23D, the IBC mode can be implemented using local on-chip memory for hardware implementations in some examples.

According to an aspect of the disclosure, the IBC mode can interact with other coding tools. In some examples (e.g., VVC), IBC mode can interact with other inter coding tools such as pairwise merge candidate, history based motion vector predictor (HMVP), combined intra/inter prediction mode (CIIP), merge mode with motion vector difference (MMVD), and geometric partitioning mode (GPM).

In some examples, the IBC mode can be used with pairwise merge candidate and HMVP. In an example, a new pairwise IBC merge candidate can be generated by averaging two IBC merge candidates. In another example, for HMVP, an IBC motion (e.g., block vector) can be inserted into history buffer for future referencing.

In some examples, IBC mode cannot be used in combination with certain the inter prediction tools, such as affine motion, CIIP, MMVD, and GPM.

In some examples, IBC is not allowed for the chroma coding blocks when DUAL_TREE partition is used.

It is noted that IBC mode in VVC is unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa.

In some examples (e.g., in VCC), following IBC design aspects can be applied. In an example, IBC shares the same process as in regular MV merge including with pairwise merge candidate and history based motion predictor, but disallows TMVP and zero vector that are invalid for IBC mode. In another example, separate HMVP buffers (5 candidates each) are used for conventional MV and IBC. In another example, block vector constraints are implemented in the form of bitstream conformance constraint, the encoder needs to ensure that no invalid vectors are present in the bitstream, and merge shall not be used if the merge candidate is invalid (out of range or 0). Such bitstream conformance constraint is expressed in terms of a virtual buffer. In another example, for deblocking, IBC is handled as inter mode. In another example, if the current block is coded using IBC prediction mode, AMVR does not use quarter-pel; instead, AMVR is signaled to only indicate whether MV is inter-pel or 4 integer-pel. In another example, the number of IBC merge candidates can be signaled in the slice header separately from the numbers of regular, subblock, and geometric merge candidates.

In some examples, a virtual buffer (concept) is used to describe the allowable reference region for IBC prediction mode and valid block vectors. For example, the CTU size id denoted as ctbSize, the virtual buffer (denoted by ibcBuf) has a width of wIbcBuf=128×128/ctbSize and a height of hIbcBuf=ctbSize. In an example, for a CTU size of 128×

128, the size of ibcBuf is also 128×128; for a CTU size of 64×64, the size of ibcBuf is 256×64; and a CTU size of 32×32, the size of ibcBuf is 512×32.

Virtual pipeline data units (VPDUs) are generally non-overlapping units of samples in a picture. The size of a VPDU is min (ctbSize, 64) in each dimension, a parameter W, is defined accordingly W, =min (ctbSize, 64).

The virtual buffer for IBC ibcBuf is suitably maintained. For example, at the beginning of decoding each CTU row, the whole ibcBuf is refreshed with an invalid value −1. Further, at the beginning of decoding a VPDU (xVPDU, yVPDU) relative to the top-left corner of the picture, the virtual buffer is suitably set, for example by setting ibcBuf [x] [y]=−1, with x=xVPDU % wIbcBuf, . . . , xVPDU % wIbcBuf+$W_v$−1; y=yVPDU % ctbSize, . . . , yVPDU % ctbSize+$W_v$−1. Further, after decoding a CU contains (x, y) relative to the top-left corner of the picture, the virtual buffer can be set according to the reconstructed samples, such as setting ibcBuf [x % wIbcBuf] [y % ctbSize]=recSample [x] [y].

In some examples, for a block covering the coordinates (x, y), if a specific condition with regard to the virtual buffer is true for a block vector by (bv [0], bv [1]), then the block vector is valid; otherwise, the block vector is not valid. The specific condition is ibcBuf (x+bv/0)% wIbcBuff [(y+bv [1]) % ctbSize] shall not be equal to −1.

According to an aspect of disclosure, statistics data shows that IBC merge mode is often used for relatively small block sizes. When a current block is coded in the IBC merge mode, a merge candidate index is used to indicate which of the block vectors in a merge candidate list from neighboring candidate IBC coded blocks is used to predict the current block. The merge candidate list can include spatial, HMVP, and pairwise candidates. A large number of small blocks in the IBC merge mode can cause higher signaling cost.

Aspects of the disclosure provide a subblock based IBC merge mode to reduce signaling cost. When a current block is in the subblock based IBC merge mode, the current block can include multiple subblocks, and each subblock may have a different block vector (BV).

Figure 24:
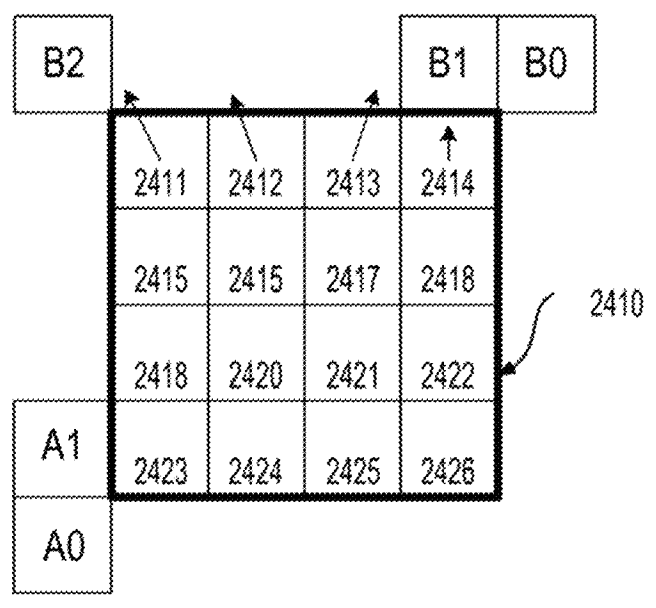

FIG. 24 shows a diagram of a current block (2410) in a subblock based IBC merge mode in an example. The current block (2410) includes a plurality of subblocks, such as subblocks (2411)-(2426) in FIG. 24. The subblocks can have different block vectors (also referred to as subblock BVs). In FIG. 24, four arrows from center of the subblocks (2411)-(2414) indicates the subblock BVs respectively for the subblocks (2411)-(2414), the block vectors can have different directions and different amplitudes. It is noted that, for clarity, block vectors for the subblocks (2415)-(2426) are not shown in FIG. 24.

In some embodiments, the different block vectors for the multiple subblocks can be indicated by a predictor block in the same picture as the current block. In some examples, the predictor block has the same size as the current block. A block vector of a subblock in the current block can be predicted based on a block vector at a corresponding location (for the subblock) in the predictor block. In an example, the predictor block includes predictor subblocks corresponding to the subblocks of the current block. Then, a block vector of a subblock in the current block can be predicted based on a block vector (also referred to as predictor block vector) of a corresponding predictor subblock in the predictor block.

In an embodiment, the predictor block in the subblock based IBC merge mode can be indicated by a block vector (that is referred to as an offset BV or predictor offset) from a spatially neighboring coding block. In some examples, the subblock BVs are derived in two steps.

Figure 25:
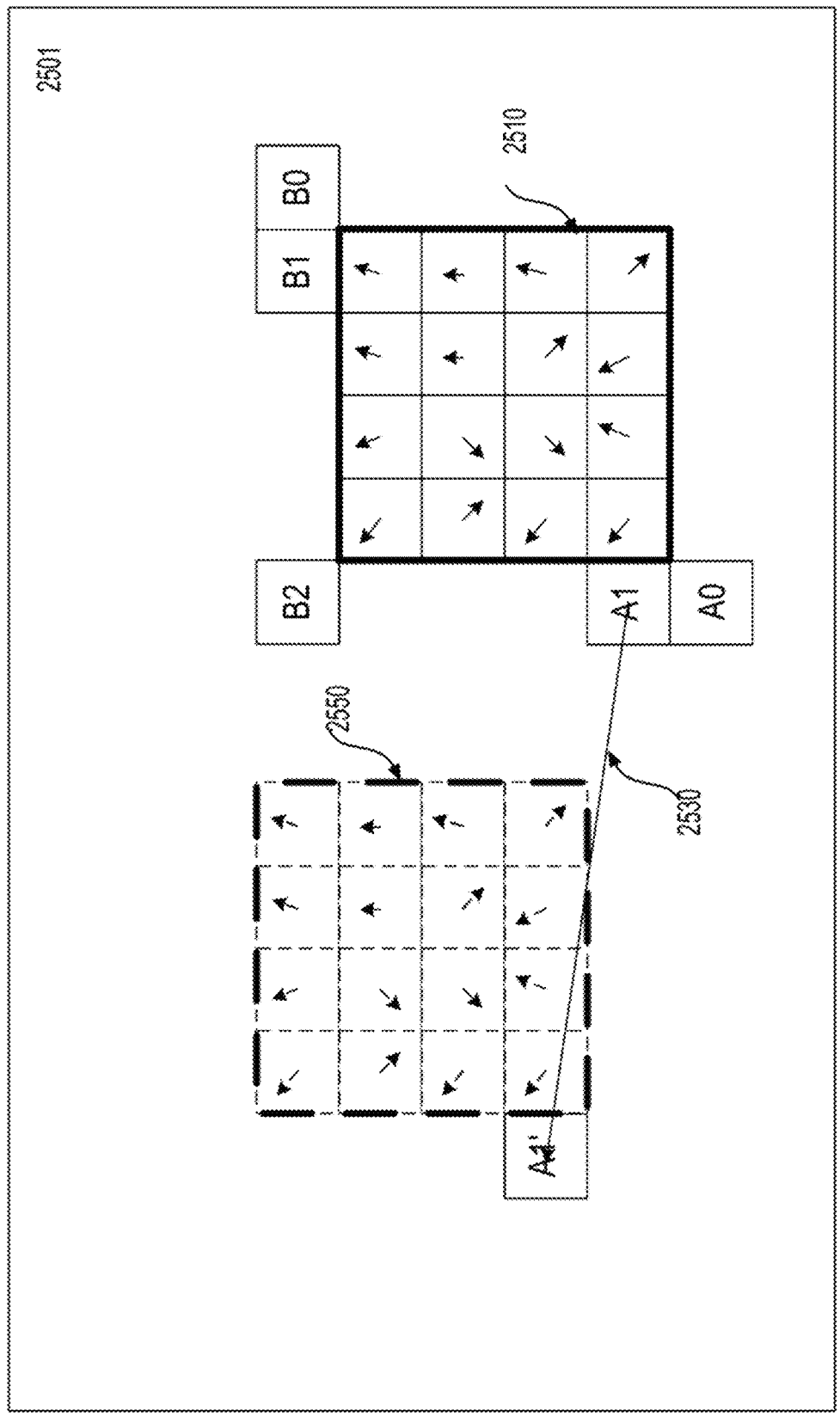
FIG. 25 shows a diagram illustrating a derivation of a block vector for a subblock in a subblock based IBC merge mode in some examples.

FIG. 25 shows a diagram illustrating a derivation of subblock BVs in the subblock based IBC merge mode in some examples. In the FIG. 25 example, a current block (2510) in a current picture (2501) is in the subblock based IBC merge mode. The current block (2510) includes multiple subblocks that have different subblock BVs. For example, the current block (2510) includes 16 subblocks that have different subblock BVs shown by arrows. In some examples, the subblock BVs can be derived in a first step and a second step. In the first step, a predictor block corresponding to the current block is determined. The predictor block includes predictor subblocks respectively corresponding to the subblocks in the current block. In the second step, the subblock BVs of the subblocks in the current block are determined according to corresponding predictor subblocks in the predictor block.

Specifically, in some examples, in the first step, an offset BV is obtained from one of the spatial neighboring blocks, such as an offset BV (2530) from a left neighbor A1 as depicted in FIG. 25. The offset BV is also referred to as predictor offset in some examples. The offset BV (2530) is applied to the current block (2510) to find a predictor block (2550) in the current picture (2501). The predictor block (2550) includes multiple predictor subblocks respectively corresponding to the subblocks of the current block (2510). In the FIG. 25 example, the left neighbor A1 is coded in IBC mode, the block vector of the left neighbor A1 indicates a displacement between the reference block A1' for the block A1 and the block A1, and can be used as the offset BV (2530) to determine the predictor block (2550) corresponding to the current block (2510). For example, the block A1 is the left neighbor of the current block (2510) and the block A1' is the left neighbor of the predictor block (2550).

In an embodiment, the spatial neighboring block used for deriving the offset BV is a fixed spatial neighbor, such as the left neighbor of A1 as depicted in FIG. 25.

In another embodiment, the spatial neighboring block used for deriving the offset BV is selected from one of the spatial neighbors used for regular IBC merge mode. The selected spatial neighbor can be signaled in the bitstream.

In another embodiment, a first available offset BV in a checking order of spatial neighbors is used for deriving the offset BV without signaling in the bitstream. The checking order of spatial neighbors is the same as that in regular merge mode in an example, for example in an order of B1, A1, B0, A0 and B2.

In another embodiment, a neighboring block used for deriving the offset BV is selected from both adjacent and non-adjacent neighbors.

It is noted that when there's no candidate with available offset BV, the subblock based IBC mode is not applicable to the current block.

In some examples, in the second step, for each subblock with a size of N×N luma samples, the subblock BV is derived from the corresponding subblock position within the predictor block, N is positive integer. In an example, N is equal to 4; in another example, Nis equal to 8.

In an embodiment, when deriving a subblock BV for a subblock in the current block (2510), a corresponding subblock BV predictor for the subblock is determined. The corresponding subblock BV predictor is used as the subblock BV directly. In an example, the subblock has a corresponding region (also referred to as a corresponding predictor subblock in some examples) in the predictor block (2550), for example, according to the offset BV. In an example, the predictor subblock can be a subblock BV predictor for the subblock, thus a block vector associated with the predictor subblock can be used as the subblock BV of the subblock.

In another embodiment, when deriving a subblock BV for a subblock in the current block (2510), a corresponding subblock BV predictor for the subblock is determined. A sum of the corresponding subblock BV predictor and the offset BV is used as the subblock BV of the subblock. In an example, the subblock has a corresponding predictor subblock in the predictor block (2550), for example, according to the offset BV. In an example, the predictor subblock can be a subblock BV predictor for the subblock, thus a sum of a block vector associated with the predictor subblock and the offset BV can be used as the subblock BV of the subblock.

In another embodiment, when deriving a subblock BV for a subblock in the current block (2510), the center position (N/2, N/2) within the subblock is used to identify the corresponding subblock BV predictor in the predictor block (2550). In an example, the center position of the subblock has a corresponding position in the predictor block (2550), for example according to the offset BV. In some examples, a picture is formed by minimal blocks (e.g., 4×4 luma samples in VVC). A block vector of a minimal block where the corresponding position falls into is used as the corresponding subblock BV predictor for the subblock.

In another embodiment, when deriving a subblock BV for a subblock in the current block (2510), the subblock has a corresponding predictor subblock in the predictor block (2550), for example, according to the offset BV. The corresponding predictor subblocks can overlap with one or more minimal blocks (e.g., 4×4 luma samples in VVC). In an example, BVs of all the minimal blocks which are overlapping with the corresponding predictor subblock are averaged with equal weighting to calculate an averaged result BV, and the averaged result BV is used as the corresponding subblock BV predictor for the subblock.

In another embodiment, when deriving a subblock BV for a subblock in the current block (2510), the subblock has a corresponding predictor subblock in the predictor block (2550), for example, according to the offset BV. The corresponding predictor subblock can overlap with one or more minimal blocks (e.g., sized 4×4 luma samples in VVC). In an example, the BVs of all the minimal blocks which are overlapping with the corresponding predictor subblock are averaged with weighting proportional to the respective overlapped areas to calculate an averaged result BV, and the averaged result BV is used as the corresponding subblock BV predictor for the subblock.

In another embodiment, when deriving a subblock BV for a subblock in the current block (2510), minimal blocks in the predictor block (2550) are checked according to a predefined order. Then, the first minimal block (e.g., sized 4×4 luma samples in VVC) in the predictor block (2550) with valid IBC BV value is used as the corresponding subblock BV predictor for the subblock.

It is noted that, in some examples, for a subblock in the current block (2510), no valid BV is available within the corresponding predictor subblock in the predictor block (2550), the offset BV is then used as the subblock BV predictor and can be applied to the subblock directly.

In some examples, the subblock based IBC merge mode is signaled as a merge candidate on the IBC merge candidate list. In an example, the subblock based IBC merge candidate is put as the first candidate on the IBC merge candidate list if available, followed by other IBC merge candidates. In another example, the subblock based IBC merge candidate is put after all the regular IBC merge candidates on the IBC merge candidate list. In another example, the subblock based IBC merge candidate is put right before the IBC HMVP candidates in the IBC merge candidate list.

In some examples, when the IBC merge mode for the current block is the subblock based IBC merge mode, IBC HMVP list update process for the current block is different from the HMVP list update process for a coding block with regular IBC merge mode. In an example, IBC HMVP list is not updated for the current block when the current block is coded with subblock based IBC merge mode.

In some examples, IBC HMVP list is updated using a BV at a specific position of the current block when the current block is coded with subblock based IBC merge mode. In an example, IBC HMVP list is updated using the BV of a subblock (also referred to as top-left subblock) at top-left position of the current block when the current block is coded with subblock based IBC merge mode. In another example, IBC HMVP list is updated using the BV of a subblock (also referred to as bottom right subblock) at bottom-right of the current block when the current block is coded with subblock based IBC merge mode. In another example, IBC HMVP list is updated using the value of the offset BV for the current block (e.g., the value of the offset BV (2530) in FIG. 25) when the current block is coded with subblock based IBC merge mode.

In some examples, when reference region constraint is applied for IBC, the derivation of candidates for predicting a current block in the subblock based IBC merge mode may also be constrained accordingly. In an embodiment, when a potential offset BV derived from a neighboring block indicates a predictor block that is partially or fully out of the valid IBC reference region, the subblock based IBC merge candidate (e.g., the neighboring block with the potential offset BV) is considered unavailable for predicting the current block in the subblock based IBC merge mode. In another embodiment, when an offset BV of a subblock based IBC merge candidate indicates a valid predictor block in the valid IBC reference region, however a final subblock BV derived from the subblock based IBC merge candidate points out of the valid reference region, the final subblock BV may be changed to the offset BV instead.

In some examples, a high-level syntax is signaled to indicate whether subblock based IBC merge mode is enabled. The high level syntax can be signaled at sequence level, picture level, slice level, tile level, or tile-group level. In an example, when IBC tool is disabled according to a high-level syntax, subblock based IBC merge mode is inferred to be disabled at the same level without additional signaling.

Figure 26:
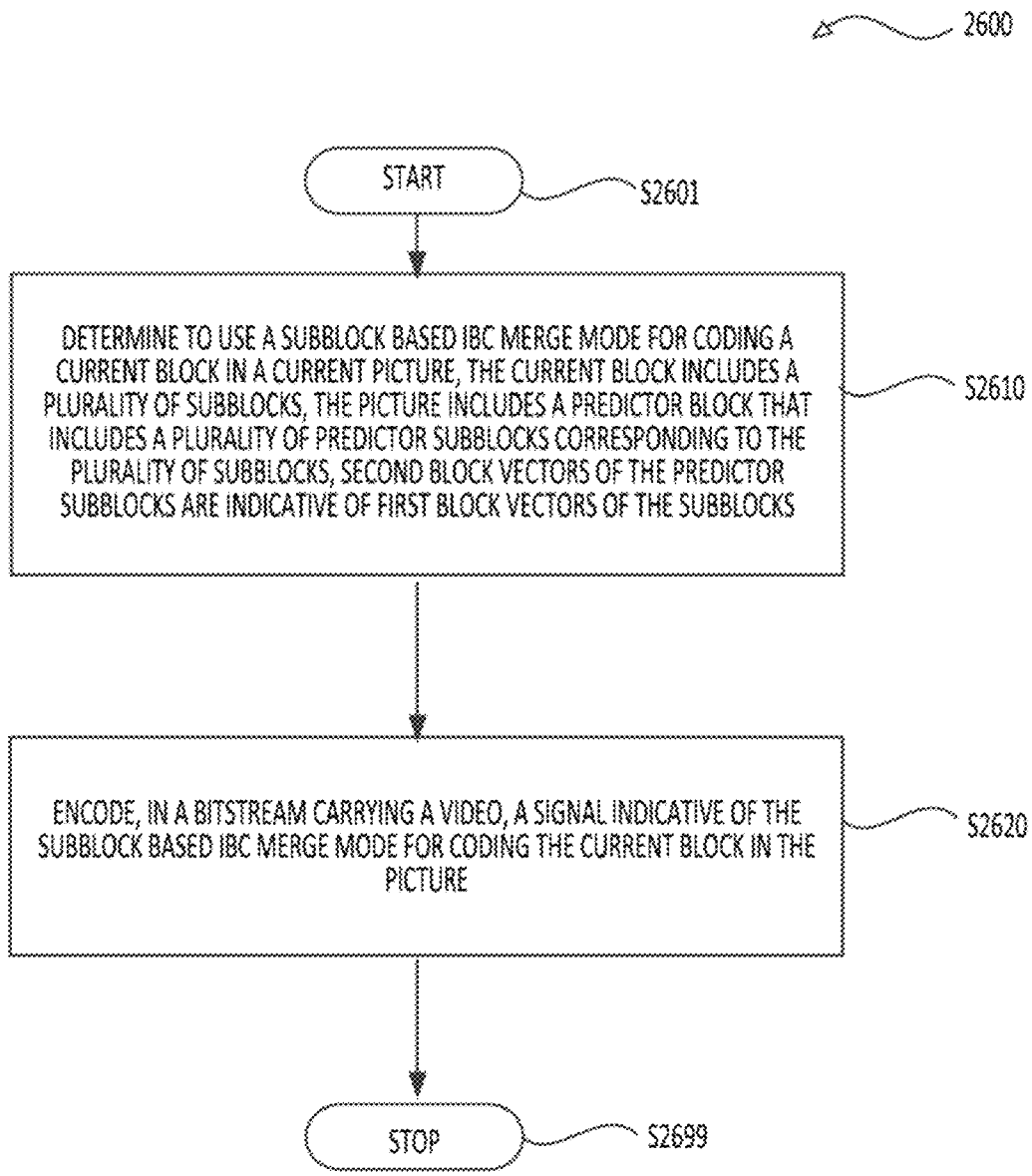
FIG. 26 shows a flow chart outlining a process according to some embodiments of the disclosure.

FIG. 26 shows a flow chart outlining a process (2600) according to an embodiment of the disclosure. The process (2600) can be used in a video encoder. In various embodiments, the process (2600) is executed by processing circuitry, such as the processing circuitry in the terminal devices (310), (320), (330) and (340), the processing circuitry that performs functions of the video encoder (403), the processing circuitry that performs functions of the video encoder (603), the processing circuitry that performs functions of the video encoder (703), and the like. In some embodiments, the process (2600) is implemented in software instructions, thus when the processing circuitry executes the software instructions, the processing circuitry performs the process (2600). The process starts at (S2601) and proceeds to (S2610).

At (S2610), a subblock based IBC merge mode is determined for coding a current block in a current picture. The current block includes a plurality of subblocks, the current picture includes a predictor block that includes a plurality of predictor subblocks corresponding to the plurality of subblocks. The subblocks of the current block have first block vectors, the predictor subblocks of the predictor block have second block vectors. The second block vectors for the predictor subblocks are indicative of the first block vectors for the subblocks.

At (S2620), a signal indicative of the subblock based IBC merge mode is encoded into a bitstream carrying a video including the current picture.

In some examples, a block vector of a spatial neighbor of the current block can indicate the predictor block, and the block vector that indicates the predictor block is referred to as offset BV or predictor offset. In an example, the spatial neighbor is a fixed spatial neighbor of the current block. In another example, the spatial neighbor is an adjacent neighbor of the current block. In another example, the spatial neighbor is a non adjacent neighbor of the current block.

In an example, a signal indicative of the spatial neighbor is encoded in the bitstream.

In another example, a first available block vector from spatial neighbors can indicate the predictor block.

In some examples, the second block vectors associated with the predictor subblocks are the same as the first block vectors of the subblocks.

In some examples, a sum of a second block vector for a predictor subblock and the offset BV is equal to a first block vector for a subblock corresponding to the predictor subblock.

In some examples, an index for an IBC merge list is encoded, and the index indicates a predefined position for inserting the subblock based IBC merge mode in the IBC merge list. In an example, the subblock based IBC merge mode is inserted into the IBC merge list at a first candidate position in the IBC merge list. In another example, the subblock based IBC merge mode is inserted into the IBC merge list at a position after all regular IBC merge candidates. In another example, the subblock based IBC merge mode is inserted into the IBC merge list at a position before IBC history based motion vector predictor (HMVP) candidates.

In an example, an IBC HMV list is updated using a block vector of a top left subblock of the current block. In another example, the IBC HMV list is updated using a block vector of a bottom right subblock of the current block. In another example, the IBC HMV list is updated using the offset BV of the current block. In another example, an update of an IBC history based motion vector predictor (HMVP) list is skipped in response to the current block being in the subblock based IBC merge mode.

In some examples, a high level syntax that indicates the subblock based IBC merge mode is enabled can be encoded. In some examples, when a high level syntax that indicates a disable of IBC is encoded into the bitstream, the subblock based IBC merge mode is inferred to be disabled at a same level as the high level syntax.

Then, the process proceeds to (S2699) and terminates.

The process (2600) can be suitably adapted. Step(s) in the process (2600) can be modified and/or omitted. Additional step(s) can be added. Any suitable order of implementation can be used.

Figure 27:
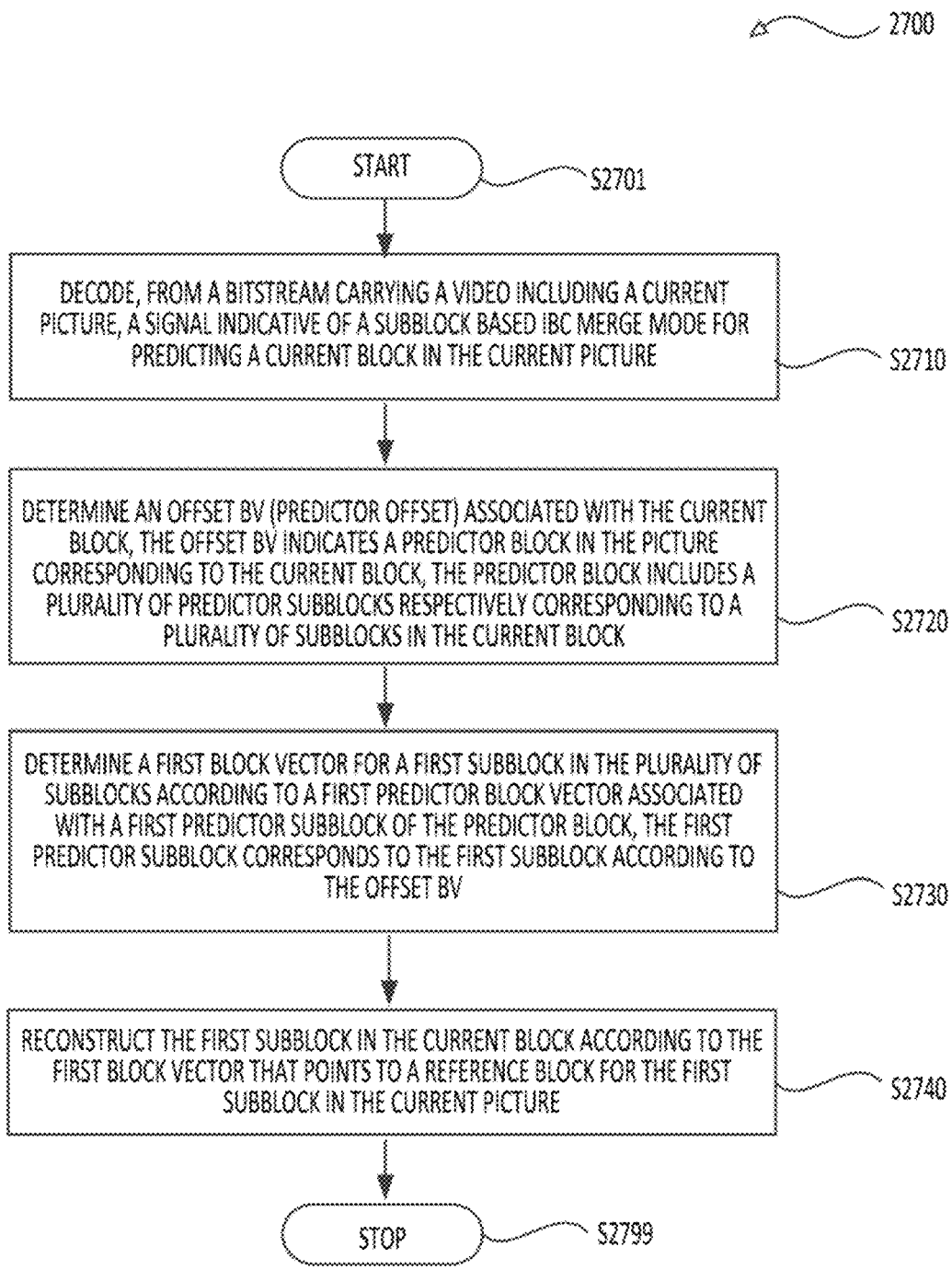
FIG. 27 shows a flow chart outlining another process according to some embodiments of the disclosure.

FIG. 27 shows a flow chart outlining a process (2700) according to an embodiment of the disclosure. The process (2700) can be used in a video decoder. In various embodiments, the process (2700) is executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (2700) is implemented in software instructions, thus when the processing circuitry executes the software instructions, the processing circuitry performs the process (2700). The process starts at (S2701) and proceeds to (S2710).

At (S2710), from a bitstream carrying a video, a signal indicative of a subblock based intra block copy (IBC) merge mode for predicting a current block in a current picture is decoded.

At (S2720), an offset block vector (BV) (also referred to as predictor offset) associated with the current block is determined. The offset BV indicates a predictor block in the current picture corresponding to the current block. The current block includes a plurality of subblocks. The predictor block includes a plurality of predictor subblocks respectively corresponding to the plurality of subblocks. Block vector information of the plurality of predictor subblocks can indicate block vector information of the plurality of corresponding subblocks.

At (S2730), a first block vector of a first subblock in the plurality of subblocks is determined according to a first predictor block vector associated with a first predictor subblock of the predictor block, the first predictor subblock corresponds to the first subblock according to the offset BV.

At (S2740), the first subblock in the current block is reconstructed according to the first block vector that points to a reference block for the first subblock in the current picture.

In some examples, the offset BV is determined according to a block vector of a spatial neighbor of the current block. In an example, the spatial neighbor is a fixed spatial neighbor for the current block. In another example, the spatial neighbor is an adjacent neighbor of the current block. In another example, the spatial neighbor is a non adjacent neighbor of the current block.

In an example, a signal indicative of the spatial neighbor from a plurality of spatial neighbor is decoded from the bitstream.

In another example, spatial neighbors of the current block are checked according to a checking order for a first available block vector. The offset BV is determined according to the first available block vector.

In some examples, the first predictor block vector associated with the first predictor subblock is used as the first block vector of the first subblock. In some examples, a sum of the first predictor block vector and the offset BV is used as the first block vector of the first subblock.

In some examples, the current picture is formed by minimal blocks, such as 4×4 luma samples. A specific minimal block in the predictor block is determined, the specific minimal block has a point corresponding to a center point of the first subblock according to the offset BV. The first block vector of the first subblock is determined according to a block vector associated with the specific minimal block.

In some examples, one or more minimal blocks that overlap with the first predictor subblock are determined. One or more block vectors respectively associated with the one or more minimal blocks are averaged with equal weight to calculate the first predictor block vector.

In some examples, one or more minimal blocks that overlap with the first predictor subblock are determined. One or more weights respectively for the one or more minimal blocks are determined according to respective overlapping area of the one or more minimal blocks with the first predictor subblock. A weighted average of one or more block vectors respectively associated with the one or more minimal blocks is calculated according to the one or more weights. The weighted average is used as the first predictor block vector associated with the first predictor subblock.

In some examples, one or more minimal blocks that overlap with the first predictor subblock is checked for a first valid block vector. The first block vector is determined according to the first valid block vector.

In some examples, to decode the signal indicative of the subblock based IBC merge mode, an index for an IBC merge list is decoded, the subblock based IBC merge mode has been inserted in the IBC merge list at a position corresponding to the index. In an example, the subblock based IBC merge mode is inserted into the IBC merge list at a first candidate position in the IBC merge list. In an example, the subblock based IBC merge mode is inserted into the IBC merge list at a position after all regular IBC merge candidates. In another example, the subblock based IBC merge mode is inserted into the IBC merge list at a position before IBC history based motion vector predictor (HMVP) candidates.

In an example, an IBC history based motion vector predictor (HMVP) list is updated using a block vector of a top left subblock of the current block. In another example, the IBC HMVP list is updated using a block vector of a bottom right subblock of the current block. In another example, the IBC HMVP list is updated using the offset BV of the current block. In another example, an update of the IBC HMVP list is skipped in response to the current block being in the subblock based IBC merge mode.

In some examples, to determine the offset BV associated with the current block, a potential predictor block indicated by a block vector of a spatial neighbor of the current block is checked to determine whether the potential predictor block is at least partially out of a valid IBC reference region. The block vector of the spatial neighbor is determined to be unavailable for being a candidate for predicting the current block in the subblock based IBC merge mode in response to the potential predictor block being at least partially out of the valid IBC reference region.

In some examples, the predictor block indicated by the offset BV is fully in a valid reference region, the first block vector of the first subblock is checked to determine whether a reference region pointed by the first block vector for the first subblock is at least partially out of the valid IBC reference region. The block vector for the first subblock is changed to the offset BV in response to the reference region pointed by the first block vector is at least partially out of the valid IBC reference region.

In some examples, from the bitstream, a high level syntax that indicates the subblock based IBC merge mode is enabled is decoded.

In some examples, from the bitstream, a high level syntax that indicates a disable of IBC is decoded. Then, the subblock based IBC merge mode is inferred to be disabled at a same level as the high level syntax.

Then, the process proceeds to (S2799) and terminates.

The process (2700) can be suitably adapted. Step(s) in the process (2700) can be modified and/or omitted. Additional step(s) can be added. Any suitable order of implementation can be used.

The techniques described above, can be implemented as computer software using computer-readable instructions and physically stored in one or more computer-readable media. For example, FIG. 28 shows a computer system (2800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 28:
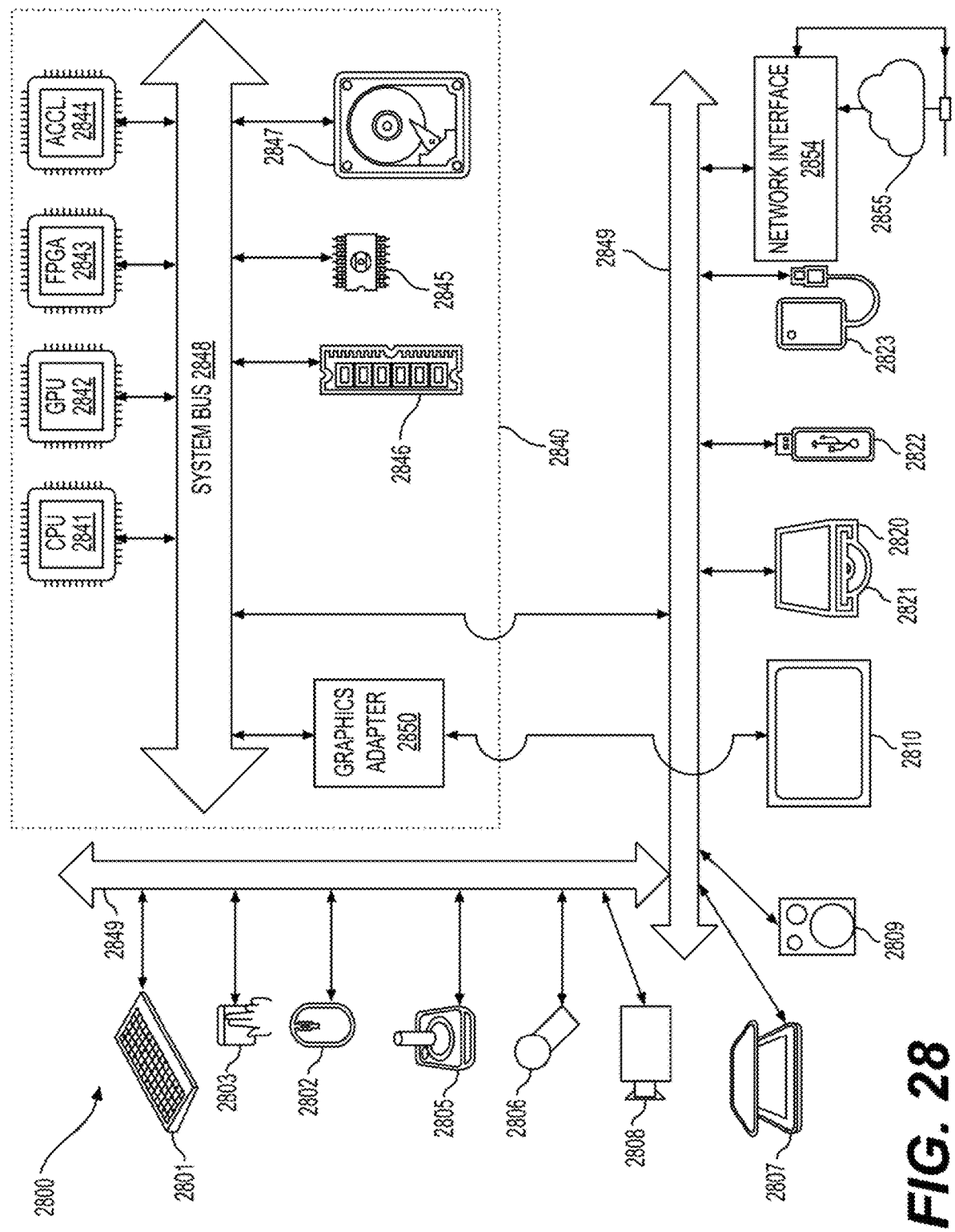
FIG. 28 is a schematic illustration of a computer system in accordance with an embodiment.

The components shown in FIG. 28 for computer system (2800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2800).

Computer system (2800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2801), mouse (2802), trackpad (2803), touch screen (2810), data-glove (not shown), joystick (2805), microphone (2806), scanner (2807), camera (2808).

Computer system (2800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2810), data-glove (not shown), or joystick (2805), but there can also be tactile feedback devices that do not serve as input devices), audio output devices (such as: speakers (2809), headphones (not depicted)), visual output devices (such as screens (2810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2800) can also include human accessible storage devices and their associated media such as optical media including CD/DVD ROM/RW (2820) with CD/DVD or the like media (2821), thumb-drive (2822), removable hard drive or solid state drive (2823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2800) can also include an interface (2854) to one or more communication networks (2855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2849) (such as, for example USB ports of the computer system (2800)); others are commonly integrated into the core of the computer system (2800) by attachment to a system bus as described below (for example Ethernet interface into a PC computer system or cellular network interface into a smartphone computer system). Using any of these networks, computer system (2800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2840) of the computer system (2800).

The core (2840) can include one or more Central Processing Units (CPU) (2841), Graphics Processing Units (GPU) (2842), specialized programmable processing units in the form of Field Programmable Gate Areas (FPGA) (2843), hardware accelerators for certain tasks (2844), graphics adapters (2850), and so forth. These devices, along with Read-only memory (ROM) (2845), Random-access memory (2846), internal mass storage such as internal non-user accessible hard drives, SSDs, and the like (2847), may be connected through a system bus (2848). In some computer systems, the system bus (2848) can be accessible in the form of one or more physical plugs to enable extensions by additional CPUs, GPU, and the like. The peripheral devices can be attached either directly to the core's system bus (2848), or through a peripheral bus (2849). In an example, the screen (2810) can be connected to the graphics adapter (2850). Architectures for a peripheral bus include PCI, USB, and the like.

CPUs (2841), GPUs (2842), FPGAs (2843), and accelerators (2844) can execute certain instructions that, in combination, can make up the aforementioned computer code. That computer code can be stored in ROM (2845) or RAM (2846). Transitional data can be also be stored in RAM (2846), whereas permanent data can be stored for example, in the internal mass storage (2847). Fast storage and retrieve to any of the memory devices can be enabled through the use of cache memory, that can be closely associated with one or more CPU (2841), GPU (2842), mass storage (2847), ROM (2845), RAM (2846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2800), and specifically the core (2840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2840) that are of non-transitory nature, such as core-internal mass storage (2847) or ROM (2845). The software implementing various embodiments of the present disclosure can be stored in such devices and executed by core (2840). A computer-readable medium can include one or more memory devices or chips, according to particular needs. The software can cause the core (2840) and specifically the processors therein (including CPU, GPU, FPGA, and the like) to execute particular processes or particular parts of particular processes described herein, including defining data structures stored in RAM (2846) and modifying such data structures according to the processes defined by the software. In addition or as an alternative, the computer system can provide functionality as a result of logic hard-wired or otherwise embodied in a circuit (for example: accelerator (2844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in a decoder, comprising:
    decoding, from a bitstream carrying a video comprising a current picture, a signal indicative of a subblock based intra block copy (IBC) merge mode for predicting a current block in the current picture, the current block comprising a plurality of subblocks;
    checking spatial neighbors according to a checking order for a first available block vector;
    determining a predictor offset according to the first available block vector of a spatial neighbor of the current block, the predictor offset indicating a predictor block in the current picture corresponding to the current block, the predictor block comprising a plurality of predictor subblocks with block vector information respectively; and
    reconstructing a subblock in the current block according to the first available block vector that points to a reference block for the subblock in the current picture.

2. The method of claim 1, wherein the spatial neighbor is at least one of:
    a fixed spatial neighbor for the current block;
    an adjacent neighbor of the current block; and
    a non adjacent neighbor of the current block.

3. The method of claim 1, further comprising:
    decoding a signal indicative of the spatial neighbor from the bitstream.

4. The method of claim 1, wherein the method further comprises:
    using a predictor block vector associated with a predictor subblock as a block vector of the subblock.

5. The method of claim 1, wherein the method further comprises:
    using a sum of a predictor block vector and the predictor offset as a block vector of the subblock.

6. The method of claim 1, wherein the current picture is formed by minimal blocks, and the method further comprises:
    determining a minimal block in the predictor block, the minimal block having a point corresponding to a center point of the subblock according to the predictor offset; and
    determining a block vector of the subblock according to a block vector associated with the minimal block.

7. The method of claim 1, wherein the current picture is formed by minimal blocks, and the method further comprises:
    determining one or more minimal blocks that overlap with a predictor subblock; and
    averaging one or more block vectors respectively associated with the one or more minimal blocks to calculate a predictor block vector.

8. The method of claim 1, wherein the current picture is formed by minimal blocks, and the method further comprises:
    determining one or more minimal blocks that overlap with a predictor subblock;
    determining one or more weights respectively for the one or more minimal blocks according to respective overlapping area of the one or more minimal blocks with a predictor subblock;
    calculating a weighted average of one or more block vectors respectively associated with the one or more minimal blocks according to the one or more weights; and
    using the weighted average as a predictor block vector associated with the predictor subblock.

9. The method of claim 1, wherein the current picture is formed by minimal blocks, and the method further comprises:
    determining one or more minimal blocks that overlap with a predictor subblock;
    checking the one or more minimal blocks according to a checking order for a first valid block vector; and
    determining block vector of the subblock according to the first valid block vector.

10. The method of claim 1, wherein the decoding the signal indicative of the subblock based IBC merge mode comprises:
    decoding an index for an IBC merge list, the subblock based IBC merge mode being inserted in the IBC merge list at a position corresponding to the index.

11. The method of claim 10, wherein the subblock based IBC merge mode is inserted into the IBC merge list at one of:
    a first candidate position in the IBC merge list;
    a position after all regular IBC merge candidates; and
    a position before IBC history based motion vector predictor (HMVP) candidates.

12. The method of claim 1, further comprising:
    updating an IBC history based motion vector predictor (HMVP) list using one of:
    a block vector of a top left subblock of the current block;
    a block vector of a bottom right subblock of the current block; and
    the predictor offset of the current block.

13. The method of claim 1, further comprising:
    skipping an update of an IBC history based motion vector predictor (HMVP) list when the current block is predicted in the subblock based IBC merge mode.

14. The method of claim 1, wherein the determining the predictor offset further comprises:
    checking whether a potential predictor block pointed by the spatial neighbor of the current block is at least partially out of a valid IBC reference region; and
    determining that a block vector of the spatial neighbor is unavailable for being a candidate for predicting the current block in the subblock based IBC merge mode when the potential predictor block is at least partially out of the valid IBC reference region.

15. The method of claim 1, further comprising:
    checking that the predictor block indicated by the predictor offset is fully in a valid IBC reference region;

determining that a block vector of the subblock points to a reference region that is at least partially out of the valid IBC reference region; and updating the block vector of the subblock to be the predictor offset when the reference region for the subblock is at least partially out of the valid IBC reference region.

16. The method of claim 1, comprising:

decoding, from the bitstream, a high level syntax that indicates the subblock based IBC merge mode is enabled.

17. The method of claim 1, comprising:

decoding, from the bitstream, a high level syntax that indicates a disable of IBC; and inferring that the subblock based IBC merge mode is disabled at a same level as the high level syntax.

18. An apparatus for video decoding, comprising processing circuitry configured to:

decode, from a bitstream carrying a video comprising a current picture, a signal indicative of a subblock based intra block copy (IBC) merge mode for predicting a current block in the current picture, the current block comprising a plurality of subblocks;

check spatial neighbors according to a checking order for a first available block vector;

determine a predictor offset according to the first available block vector of a spatial neighbor of the current block, the predictor offset indicating a predictor block in the current picture corresponding to the current block, the predictor block comprising a plurality of predictor subblocks with block vector information respectively; and reconstruct a subblock in the current block according to the first available block vector that points to a reference block for the subblock in the current picture.

19. A method of processing visual media data, the method comprising:

processing a bitstream that includes the visual media data according to a format rule, wherein the bitstream includes a video comprising a current picture; and the format rule specifies that:

a signal indicative of a subblock based intra block copy (IBC) merge mode for predicting a current block in the current picture is decoded, the current block comprising a plurality of subblocks;

spatial neighbors are checked according to a checking order for a first available block vector;

a predictor offset is determined according to the first available block vector of a spatial neighbor of the current block, the predictor offset indicating a predictor block in the current picture corresponding to the current block, the predictor block comprising a plurality of predictor subblocks with block vector information respectively; and a subblock in the current block is reconstructed according to the first available block vector that points to a reference block for the subblock in the current picture.

* * * * *